United States Patent [19]
Hirakata et al.

[11] Patent Number: 6,005,645
[45] Date of Patent: *Dec. 21, 1999

[54] STEREOSCOPIC DISPLAY DEVICE HAVING PARTICULAR CIRCUITS

[75] Inventors: Yoshiharu Hirakata, Kanagawa; Shunpei Yamazaki, Tokyo; Jun Koyama; Satoshi Teramoto, both of Kanagawa, all of Japan

[73] Assignee: Semiconductor Energy Laboratory Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/713,877

[22] Filed: Sep. 13, 1996

[30] Foreign Application Priority Data

Sep. 14, 1995 [JP] Japan .................................. 7-262595

[51] Int. Cl.$^6$ ...................... G02F 1/1335; G02F 1/1333; G02F 1/1395
[52] U.S. Cl. .............................. 349/15; 349/73; 349/151
[58] Field of Search ................................ 349/73, 15, 151

[56] References Cited

U.S. PATENT DOCUMENTS

| | | |
|---|---|---|
| 4,644,338 | 2/1987 | Aoki et al. ............................... 349/151 |
| 4,832,457 | 5/1989 | Saitoh et al. ............................. 349/73 |
| 4,906,071 | 3/1990 | Takahara et al. ......................... 349/73 |
| 5,106,197 | 4/1992 | Ohuchida et al. ........................ 349/73 |
| 5,164,853 | 11/1992 | Shimazaki ................................. 349/73 |
| 5,200,847 | 4/1993 | Mawatari et al. ....................... 349/151 |
| 5,767,924 | 6/1998 | Hiroki et al. ............................... 349/5 |
| 5,808,719 | 9/1998 | Fujiwara et al. ......................... 349/157 |

FOREIGN PATENT DOCUMENTS 61-137129  6/1986  Japan ....................................... 349/15

*Primary Examiner*—William L. Sikes
*Assistant Examiner*—Toan Ton
*Attorney, Agent, or Firm*—Fish & Richardson P.C.

[57] ABSTRACT

A simple display device capable of projecting color images. Two sets of active matrix regions and peripheral circuit regions for driving the active matrix regions are integrated on a glass substrate. The first set of active matrix regions optically modulates images of R, G, and B. The second set optically modulates images of R', G', and B'. Vertical scanning of two of the active matrix regions is controlled by a common peripheral circuit. Horizontal scanning of the first set of active matrix regions is controlled by another common peripheral circuit. Thus, the number of the peripheral circuits packed at a high density can be reduced.

5 Claims, 24 Drawing Sheets

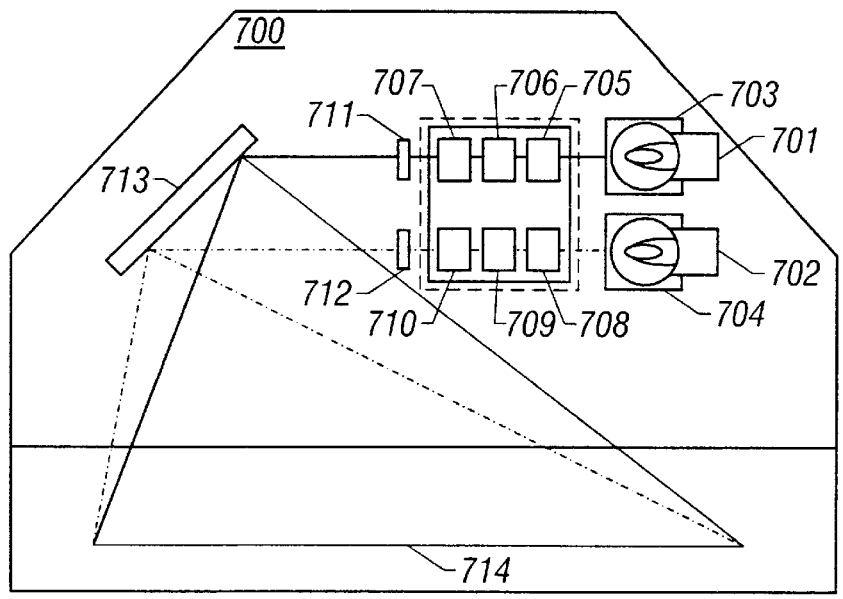
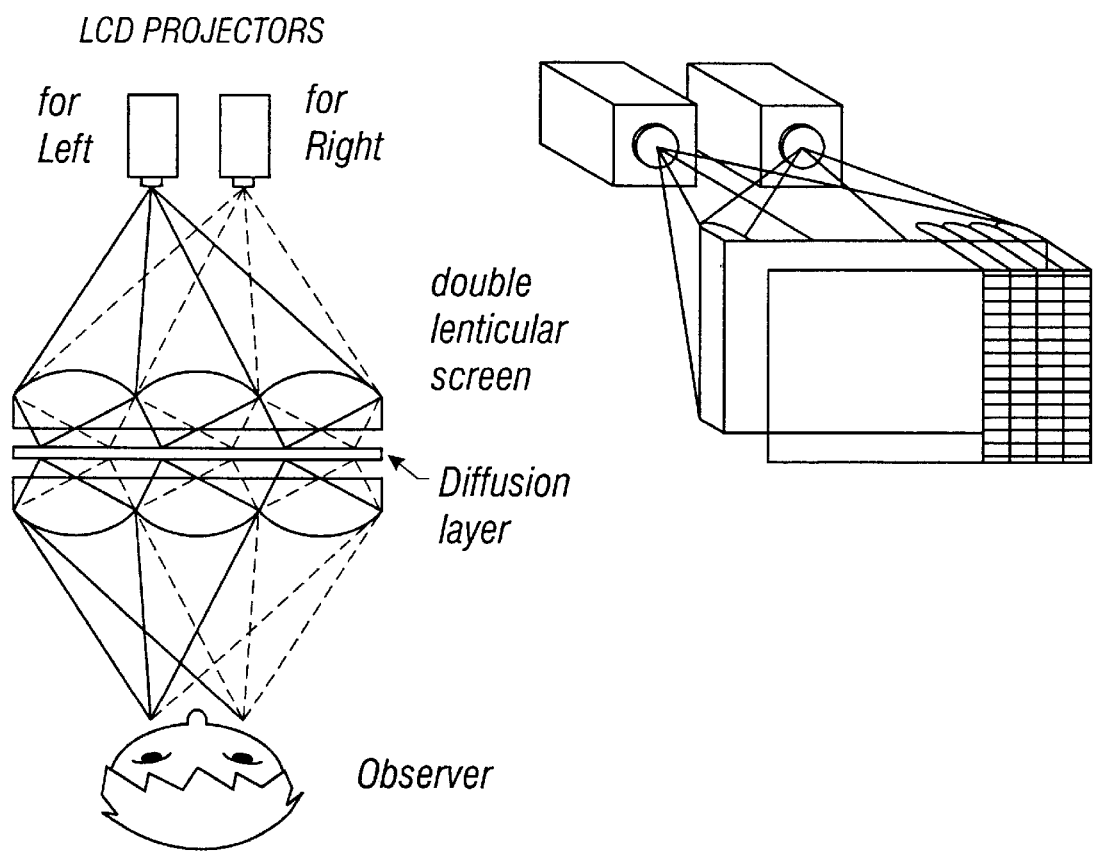
FIG. 7

FIG. 10

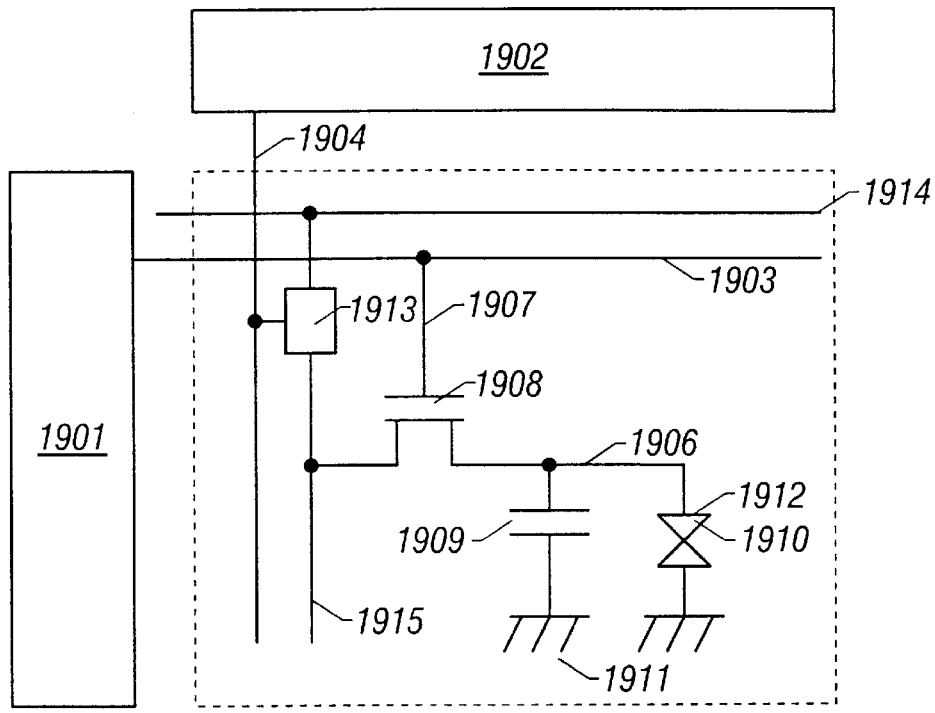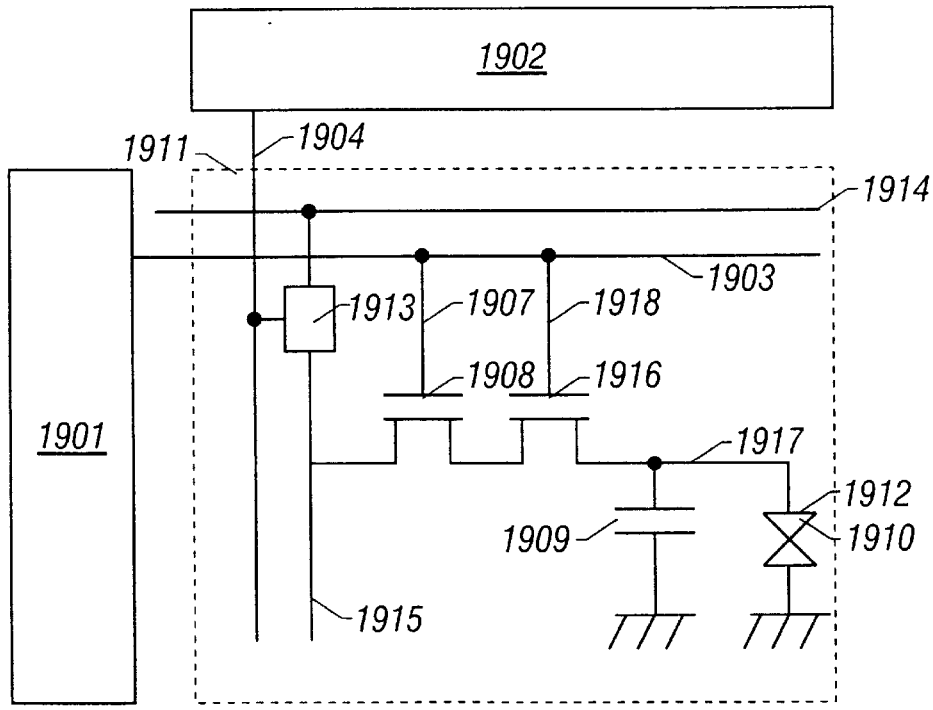

1 LINE OF DATA

```
OOOOOO · · · · · · · ·
XXXXXX · · · · · · · ·
OOOOOO · · · · · · · ·
XXXXXX · · · · · · · ·
OOOOOO · · · · · · · ·
XXXXXX · · · · · · · ·
OOOOOO · · · · · · · ·
XXXXXX · · · · · · · ·
```

O: PIXELS OF RGB
X: PIXELS OF R´G´B´

FIG. 22A

1 LINE OF DATA

```
OXOXOX · · · · · · · ·
OXOXOX · · · · · · · ·
OXOXOX · · · · · · · ·
OXOXOX · · · · · · · ·
OXOXOX · · · · · · · ·
OXOXOX · · · · · · · ·
OXOXOX · · · · · · · ·
OXOXOX · · · · · · · ·
```

O: PIXELS OF RGB
X: PIXELS OF R´G´B´

FIG. 22B

STEREOSCOPIC DISPLAY DEVICE HAVING PARTICULAR CIRCUITS

FIELD OF THE INVENTION

The present invention relates to a projection display device and also to a projection display system and, more particularly, to a system in which images optically modulated by an integrated liquid crystal panel, for example, are projected onto an appropriate screen.

DESCRIPTION OF THE PRIOR ART

Projection liquid crystal display systems have been known. Such a projection display system uses a liquid crystal panel or the like to optically modulate an image. This image is magnified and projected onto a screen by an appropriate optical system, whereby the image is displayed. Well-known techniques of this kind are described in Japanese Utility Model Laid-Open No. 111580/1983.

As described in this Japanese Utility Model Laid-Open specification, in order to display a color image, images of RGB are generally formed, using a plurality of liquid crystal panels. Then, the images of the three colors are combined into one. Where this method is adopted, it is important to align the optical axes in combining the images.

In the prior art configuration, liquid crystal panels are arranged independently. It is common practice to align the optical axes by subtly adjusting the positions or orientations of the panels. However, this scheme increases the fabrication cost and complicates the system. Furthermore, the prior art method has the disadvantage that the display characteristics vary with time.

On the other hand, an active matrix liquid crystal display providing a high-quality display of image is known. In particular, thin-film transistors (TFTs) are formed at the positions of pixels on a transparent substrate which is usually made of glass or quartz. These TFTs control electric charge held on the pixel electrodes.

This active matrix liquid crystal display needs peripheral circuits for driving TFTs arranged at the pixels. Generally, these peripheral circuits are composed of an externally attached IC circuit which is known as a driver IC.

A more advanced apparatus uses TFTs which form the above-described peripheral circuits. Thus, an integrated configuration is created on a substrate. In this configuration, the pixel regions are integrated with the peripheral circuit regions on the substrate and so the liquid crystal panel can be employed more conveniently.

In this apparatus incorporating even the peripheral circuits as described above, the device density of the peripheral circuits is increased. Therefore, more defects tend to occur. This deteriorates the production yield of the liquid crystal panel itself. Accordingly, it is desired that the peripheral circuits be made as simple as possible.

Furthermore, there is a need for a method of displaying a three-dimensional image. However, the present situation is that any appropriate three-dimensional display device having compatibility with the current two-dimensional display device is not available.

In addition, it is difficult to manufacture an active matrix construction (consisting of hundreds or more pixels× hundreds or more pixels) which is completely free from defects. Generally, the active matrix construction contains a considerable proportion of defects. If such defects are present, some dots or lines are not displayed on the image. These defective portions are known as point defects or line defects.

A device having such defects is regarded as a defective product, and the production yield deteriorates accordingly.

In the aforementioned system where a color image is projected and displayed by superimposing a plurality of images, the liquid crystal panels which are optical modulation means for forming images are arranged independently. Hence, the system is rendered complex.

SUMMARY OF THE INVENTION

It is an object of the present invention to provide a display device which is free of the foregoing problems and gives rise to high image quality but the whole structure is made as simple as possible.

It is another object of the invention to provide a display device which can be manufactured at low cost and with a high yield.

It is a further object of the invention to provide a display device capable of providing a three-dimensional display and providing a bright display.

It is a yet other object of the invention to provide a display device capable of displaying an image of considerable quality even if some defects exist.

A display device according to the present invention comprises a substrate, (M×N) active matrix regions formed on the substrate for forming an image, and (M+N) peripheral circuit regions formed on the substrate, where M and N are natural numbers equal to or greater than 2. Of the (M+N) peripheral circuit regions, the N peripheral circuit regions scan the N active matrix regions horizontally at the same time. Of the (M+N) peripheral circuit regions, the M peripheral circuit regions scan the M active matrix regions vertically at the same time.

An example of the above-described novel display device is shown in FIG. 2, where M=2 and N=3. Shown in this figure are active matrix regions 103, 104, 105, 106, 107, and 108.

Five (2+3) peripheral circuit regions 101, 102, 109, 110, and 111 act to drive these active matrix regions. Of these peripheral circuits, indicated by 101 and 102 are horizontal scanning control circuits. Indicated by 109, 110, and 111 are vertical scanning control circuits.

In the configuration shown in FIG. 2, the two (M=2) peripheral circuits 101 and 102 control horizontal scanning of their respective active matrix circuits simultaneously. In particular, the peripheral circuit 101 controls horizontal scanning of the three (N=3) active matrix circuits 103, 104, and 105. At the same time, the peripheral circuit 102 controls horizontal scanning of the three active matrix circuits 106, 107, and 108.

The three (N=3) peripheral circuits 109, 110, and 111 control vertical scanning of their respective active matrix circuits. That is, the peripheral circuit 109 controls vertical scanning of the two (M=2) active matrix circuits 103 and 106 at the same time. The peripheral circuit 110 controls vertical scanning of the two active matrix circuits 104 and 107 concurrently. The peripheral circuit 111 controls the vertical scanning of the two active matrix circuits 105 and 108 simultaneously.

In the configuration shown in FIG. 2, N is set to 3 (N=3) in order to obtain color images of RGB. It is also possible that M=N=2 (i.e., 2×2). Furthermore, it is possible that M=2 and N=1. Additionally, it is possible that M=1 and N=2. In this case, a color image is obtained by making use of color filters of R, G, and B over the active matrix regions, or a black-and-white image is obtained. As shown in FIG. 2, the (M×N) active matrix regions are arranged in rows and columns.

In another feature of the invention, pixels are arranged in rows and columns in the active matrix regions. Each pixel contains at least one thin-film transistor (TFT). Signals applied to the sources of the TFTs are controlled by horizontal scanning control provided by M peripheral circuits, respectively. Signals applied to the gates of the TFTs are controlled by vertical scanning control provided by N peripheral circuits, respectively.

In the above-described structure, the pixels can be regions indicated by (0, 0), (1, 0), . . . , (m, 0) shown in FIG. 2. In the structure shown in FIG. 2, each pixel is provided with one TFT.

The configuration shown in FIG. 2 is obtained where M=2 and N=3. That is, the M peripheral circuits are those indicated by 101 and 102. The N peripheral circuits are those indicated by 109, 110, and 111.

It is to be noted that the number of TFTs arranged in each one pixel is not limited to one. As shown in FIG. 19(B), plural TFTs may be arranged in series. As shown in FIG. 20, TFTs may be arranged in combination with MOS capacitors. Furthermore, TFTs of different channel types may be combined instead of TFTs of the same channel type.

The active matrix regions 103–108 shown in FIG. 2 form an example of an active matrix liquid crystal display. That is, the system for creating an image with the active matrix regions makes use of optical modulation which is made, using a liquid crystal.

However, the active matrix regions are not limited to optical modulation means using a liquid crystal. An image formation means utilizing electroluminescence may also be employed. That is, an image may be created from light emitted from a fluorescent body or light-emitting body by the use of the active matrix regions.

Where a liquid crystal display is utilized, it is necessary that the substrate be made of a transparent material. Specifically, the substrate is made of glass or quartz. Where an image formation means utilizing electroluminescence is used, an appropriate semiconductor substrate or insulating substrate consisting of a single crystal of silicon can be exploited.

Where a substrate made of glass or quartz is used as semiconductor devices forming active matrix regions or peripheral circuits, TFTs fabricated from the same semiconductor thin film can be used. This method is useful in integrating device elements. Where a substrate made of a semiconductor is employed, MOS devices using a semiconductor substrate can be utilized.

The active matrix structure referred to herein means pixels arranged in rows and columns, each pixel having at least one active device. These active devices act to create an image. The active matrix regions mean regions having such functions.

Another display device according to the invention comprises a substrate, (M×N) active matrix regions (where M is a natural number equal to or greater than 2; N is a natural number equal to or greater than 2) arranged on the substrate, and (M+N) peripheral circuits arranged on the substrate. The active matrix circuits have pixel regions arranged in rows and columns, at least one TFT arranged in each pixel region, pixel signal lines connected with the sources of the TFTs, and gate signal lines connected with the gates of the TFTs and extending perpendicular or substantially perpendicular to the image signal lines. The M peripheral circuits act to select image signals supplied to the image signal lines of the N active matrix regions. The N peripheral circuits act to control signals supplied to the image signal lines of the M active matrix regions. The image signal lines are supplied with image data from image sampling signal lines.

An example of the above-described novel display device is shown in FIG. 2, where M=2 and N=3. For example, one active matrix region is indicated by 103. In this region, pixels each having TFTs are arranged in m rows and n columns. As an example, an image signal line 209 is connected with the source of a TFT at a pixel located at address (0, 0). A gate line 211 substantially perpendicular to the image signal line 209 is connected with the gate.

The two (M=2) peripheral circuits 101 and 102 function to select image signals supplied to the image signal lines (such as 209) connected to their respective three (N=3) active matrix regions 103, 104, 105 and 106, 107, 108.

For example, an image sampling signal from a flip-flop circuit 201 in the peripheral circuit 101 is supplied to a conductive interconnect 208. In response to this image sampling signal, image data supplied to the image signal lines (such as 209) connected to the active matrix regions 103, 104, and 105 are accepted by a sample-and-hold circuit 204.

Image data is supplied to the image signal line 209 in the manner described now. A signal from the flip-flop circuit 201 in the peripheral circuit (horizontal scanning control circuit) 101 is supplied via the image sampling signal line 208 and enables image data R (data about image R) to be accepted into the sample-and-hold circuit 204. This enabled image data is supplied to the image signal line 209.

The three (N=3) peripheral circuits 109, 110, and 111 function to control signals supplied to the gate signal lines (such as 211) to their respective two (M=2) active matrix regions (103, 106), (104, 107), and (105, 108).

For example, the peripheral circuit (vertical scanning control circuit) 109 controls signals supplied to the gate signal lines (such as 211) to the active matrix regions 103 and 106.

A further display device according to the invention comprises a substrate, a plurality of active matrix circuits arranged in line on the substrate, and peripheral circuits for controlling horizontal or vertical scanning of the active matrix circuits. The control of the horizontal or vertical scanning by the active matrix circuits is provided by common peripheral circuits.

An example of this display device is shown in FIG. 2, where active matrix regions 103, 104, and 105 are arranged in line. Peripheral circuits 101, 102, 109, 110, and 111 serve to drive these active matrix circuits 103–105, respectively.

In the configuration shown in FIG. 2, control of horizontal scanning of the active matrix regions 103, 104, and 105 is provided by the common peripheral circuit 101. Similarly, control of vertical scanning of the active matrix regions 103 and 106 is provided by the common peripheral circuit 109.

It is to be noted that the plural active matrix circuits are not required to be strictly aligned on the same line. For example, the positions of images may be sometimes shifted from each other. The positions of active matrix circuits which are juxtaposed for setting of optical axes may be made different from each other subtly. In these cases, it is not necessary that the active matrix regions be aligned strictly.

A still other display device according to the invention comprises a substrate having transparency, two sets of active matrix regions, and peripheral circuits for controlling horizontal or vertical scanning of the active matrix circuits. The active matrix regions and the peripheral circuits are integrated on the substrate. Each set of active matrix regions consists of three active matrix regions for optical modulation of R, G, and B. The control of the horizontal or vertical scanning of each set of active matrix regions is provided by the common peripheral circuit.

An example of this display device is shown in FIG. 2, where three active matrix regions 103, 104, and 105 forming one set for optical modulation of RGB are formed on a glass substrate. Other three active matrix regions 106, 107, and 108 forming a set are also formed on the glass substrate.

Horizontal scanning of the three active matrix regions 103, 104, and 105 belonging to the same set is controlled by the same peripheral circuit 101. Similarly, horizontal scanning of the three active matrix circuits 106, 107, and 108 of the same set are controlled by the same peripheral circuit 102.

In FIG. 21, vertical scanning of active matrix regions for R, G, and B is controlled by a common peripheral circuit 2104.

A yet other display device according to the invention comprises a substrate having transparency, a plurality of sets of active matrix circuits for optical modulation of RGB, and peripheral circuits for controlling horizontal or vertical scanning of the active matrix circuits. The active matrix circuits and the peripheral circuits are integrated on the substrate. Each set of active matrix circuits is composed of three active matrix circuits. Horizontal or vertical scanning of active matrix circuits belonging to plural sets are controlled by the same peripheral circuit.

A still further display device according to the invention comprises a substrate having transparency, two sets of active matrix circuits for optical modulation of RGB, and peripheral circuits for controlling horizontal or vertical scanning of the active matrix circuits. The active matrix circuits and the peripheral circuits are integrated on the substrate. Each set of active matrix circuits is composed of three active matrix circuits. Horizontal or vertical scanning of the active matrix circuits of the two sets is controlled by the same peripheral circuit.

An example of this display device is shown in FIG. 2, where three active matrix regions 103, 104, and 105 forming one set for optical modulation of RGB are disposed. Also, other three active matrix regions 106, 107, and 108 forming one set are disposed.

Vertical scanning of the active matrix circuits 103 and 106 belonging to the two different sets is controlled by a common peripheral circuit 109. Similarly, vertical scanning of the active matrix circuits 104 and 107 belonging to the two different sets is controlled by a common peripheral circuit 110. Vertical scanning of the active matrix circuits 105 and 108 belonging to the two different sets is controlled by a common peripheral circuit 111.

An additional display device according to the invention comprises a substrate, a liquid crystal panel assembly fabricated on the substrate, and a projection means for projecting images created by plural sets of active matrix regions onto a screen. The liquid crystal panel assembly comprises the plural sets of active matrix regions and peripheral circuits integrated with the active matrix regions. Each set of active matrix regions is composed of a plurality of active matrix regions for optical modulation. The peripheral circuits act to control horizontal or vertical scanning of the active matrix regions. Horizontal or vertical scanning of the active matrix regions of the same set are controlled by a common peripheral circuit. The active matrix regions of one set creates a color image for the right eye, while the active matrix regions of the other set creates a color image for the left eye. The color images for the right and left eyes, respectively, are superimposed and projected onto a screen. Alternatively, the color images are superimposed on the screen. In this way, a three-dimensional image is displayed.

The above-described structure is an apparatus for displaying a three-dimensional image. An example of this structure is shown in FIGS. 5–7.

A yet other display device according to the invention comprises a substrate, a liquid crystal panel assembly fabricated on the substrate, and a projection means for projecting images created by two sets of active matrix regions onto a screen. The liquid crystal panel assembly comprises the two sets of active matrix regions and peripheral circuits integrated with the active matrix regions. Each set of active matrix regions is composed of three active matrix regions for optical modulation of R, G, and B. The peripheral circuits act to control horizontal or vertical scanning of the active matrix regions. Horizontal or vertical scanning of three active matrix regions belonging to two sets are controlled by a common peripheral circuit. The active matrix regions of one set creates a color image for the right eye, while the active matrix regions of the other set creates a color image for the left eye. The color images for the right and left eyes, respectively, are superimposed and projected onto a screen. Alternatively, the color images are superimposed on the screen. In this way, a three-dimensional image is displayed.

The above-described structure is an apparatus for displaying a three-dimensional image. An example of this structure is shown in FIGS. 5–7.

A plurality of active matrix circuits are integrated on the same substrate. Both horizontal and vertical scanning control circuits drive the active matrix circuits simultaneously. This permits simplification of the peripheral circuits.

For example, in the configuration shown in FIG. 2, the horizontal scanning control circuit 109 which is a single peripheral circuit controls both signals supplied to gate signal lines connected with two active matrix regions. This structure is useful in simplifying the whole configuration where plural active matrix circuits are integrated.

This configuration is made possible by selectively writing image data into pixels in the active matrix regions according to control signals and sharing the control signals among horizontal and vertical scans. That is, control of horizontal and vertical scans is shared among plural active matrix regions. Thus, common horizontal and vertical scanning control circuits are fabricated. Consequently, the number of the scanning control circuits can be reduced.

Other objects and features of the invention will appear in the course of the description thereof, which follows.

BRIEF DESCRIPTION OF THE DRAWINGS

FIG. 7 is a schematic view of a further projection display system according to the invention;

FIG. 10 is a schematic circuit block diagram of a further integrated active matrix circuit according to the invention;

FIGS. 19(A) and 19(B) are equivalent circuit diagrams of pixels used in a device according to the invention;

FIGS. 22(A) and 22(B) are diagrams illustrating images projected onto a screen in a display system according to the invention.

DETAILED DESCRIPTION OF THE PREFERRED EMBODIMENTS

EXAMPLE 1

Figure 1:
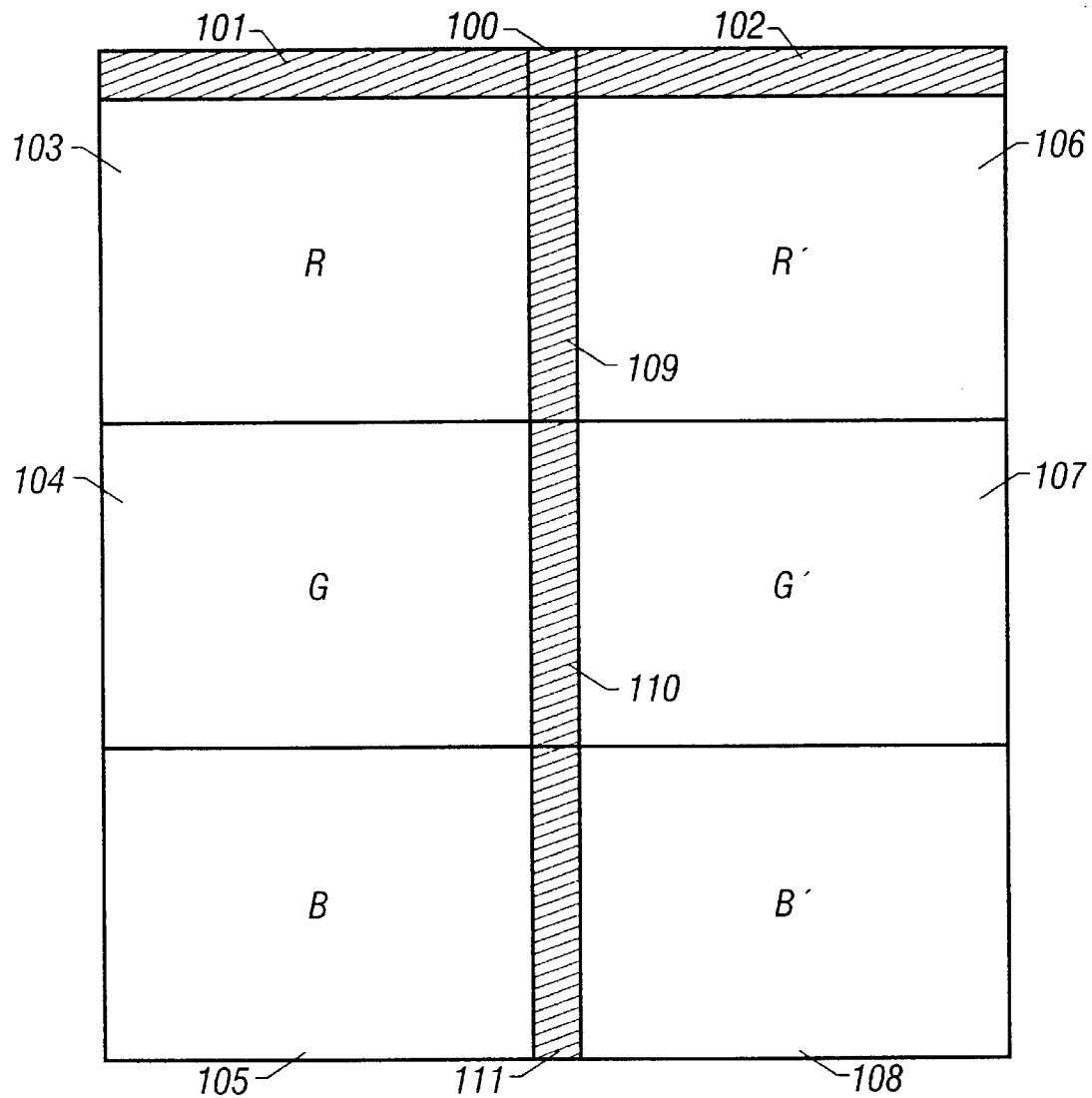
FIG. 1 is a schematic view of an integrated active matrix circuit according to the invention.

The present example pertains to the structure of an integrated liquid crystal panel consisting of six liquid crystal panels formed on a same substrate. This integrated liquid crystal panel is schematically shown in FIG. 1. The integrated panel comprises a first set of panels 103–105 (R, G, B) for forming a color image and a second set of panels 106–108 (R', G', B') for forming another color image. Peripheral circuits 101 and 102 are used for horizontal scanning of all the liquid crystal panels 103–108. Peripheral circuits 109–111 are used for vertical scanning of all the liquid crystal panels.

Figure 2:
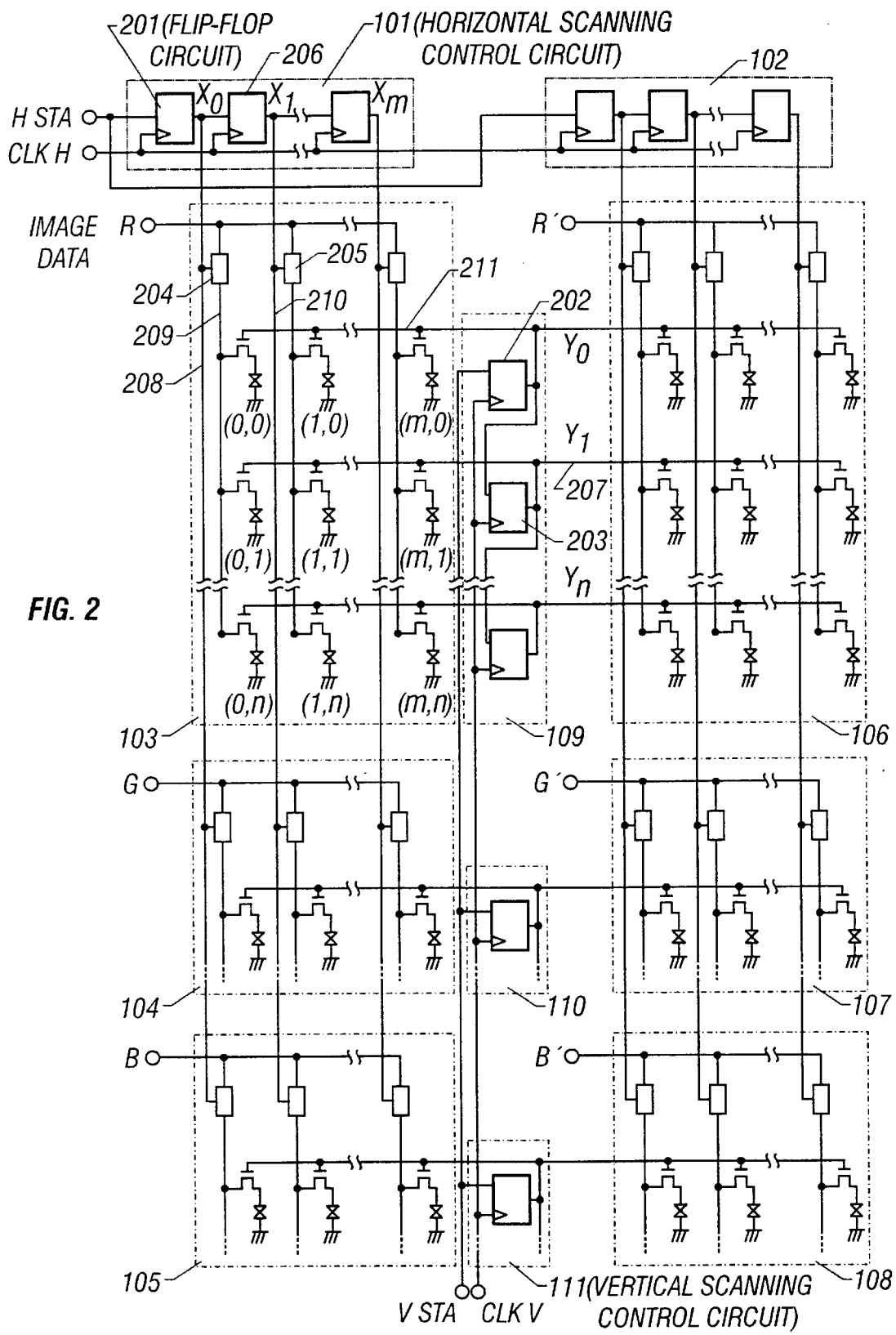
FIG. 2 is a schematic circuit block diagram of a portion of the integrated active matrix circuit shown in FIG. 1.

FIG. 2 is an equivalent circuit diagram of the configuration shown in FIG. 1. It is to be noted that like components are indicated by like reference numerals in various figures. The active matrix regions (or, pixel regions) 103 (R) and 106 (R') are particularly shown. Other regions have the same structure.

In the configuration shown in FIGS. 1 and 2, the components are generally integrated on a substrate of glass or quartz. The circuits are composed of thin-film devices typified by thin-film transistors (TFTs). Circuits comprising thin-film devices can provide a higher device density than the case where an externally attached IC circuit is used. Furthermore, the circuits can be made lighter and thinner.

The configuration shown in FIG. 2 is characterized in that clock pulses for the operation of the horizontal scanning control circuit, indicated by CLKH, are used for all active matrix regions (in the illustrated example, they are indicated by 103–108).

In this structure, the horizontal scanning control circuit 101 has a flip-flop circuit 201 operating in response to incoming clock pulses CLKH. The output signal from the flip-flop circuit 201 can simultaneously control horizontal scanning of $X_0$ rows in the active matrix region 103 for creating an image of R, the active matrix region 104 for creating an image of G, and the active matrix region 105 for creating an image of B.

In this way, the horizontal scanning of the $X_m$ rows in the active matrix regions 103, 104, and 105 is controlled by the common circuit. Therefore, the horizontal scanning control circuit 101 can be used for all these active matrix regions 103–105 (R, G, B).

Furthermore, the peripheral circuit 102 can be disposed as a horizontal scanning control circuit for all the active matrix circuits 106–108.

The structure shown in FIG. 2 is characterized in that the clock pulses for the operation of the vertical scanning control circuit CLKV are used for all of the active matrix regions 103–108.

In this structure, the vertical scanning control circuit 109 has a flip-flop circuit 202 operating in response to incoming clock pulses CLKV. The output signal from the flip-flop circuit 202 can control vertical scanning of $Y_0$ rows in the active matrix regions 103 and 106. Therefore, the vertical scanning control circuit 109 can be used to drive both active matrix regions 103 and 106.

Additionally, the vertical scanning control circuit 110 can be shared between the active matrix regions 104 and 107. Moreover, the vertical scanning control circuit 111 can be shared between the active matrix regions 105 and 108.

In the structure shown in FIG. 2, it suffices to place two horizontal scanning control circuits 101 and 102. Also, it suffices to place three vertical scanning control circuits 109, 110, and 111. That is, the six active matrix regions 103–108 for forming images of RGB and R'G'B' can be driven by the five peripheral driver circuits 101, 102, 109–111.

In the past, at least one horizontal scanning circuit and at least one vertical scanning circuit have been necessary for each one active matrix region, or pixel region. Accordingly, if 6 active matrix regions are simply integrated, 6 horizontal scanning circuits and 6 vertical scanning circuits are necessitated. That is, 12 peripheral circuits are necessary in total.

In the structure shown in FIG. 2, the number of the circuits has been reduced down to less than one half. Similarly, the area occupied by the peripheral circuits can be less than one half of the area occupied where liquid crystal panels are simply integrated. Furthermore, the number of necessary conductive interconnects can be reduced. Hence, the throughput can be enhanced. In addition, the device can be made small and simple. Further, the number of kinds of signals to the liquid crystal panels is reduced. For the interconnects for these various signals, terminals are mounted in a portion as indicated by 100 in FIG. 1.

The vertical scanning for the color images composed by RGB and R'G'B', respectively, are controlled by the common vertical scanning timing enable signal VSTA and clock pulses CLKV for the operation of the vertical scanning control circuits. Both images can be displayed at the same timing without requiring any special circuit.

Figure 23:
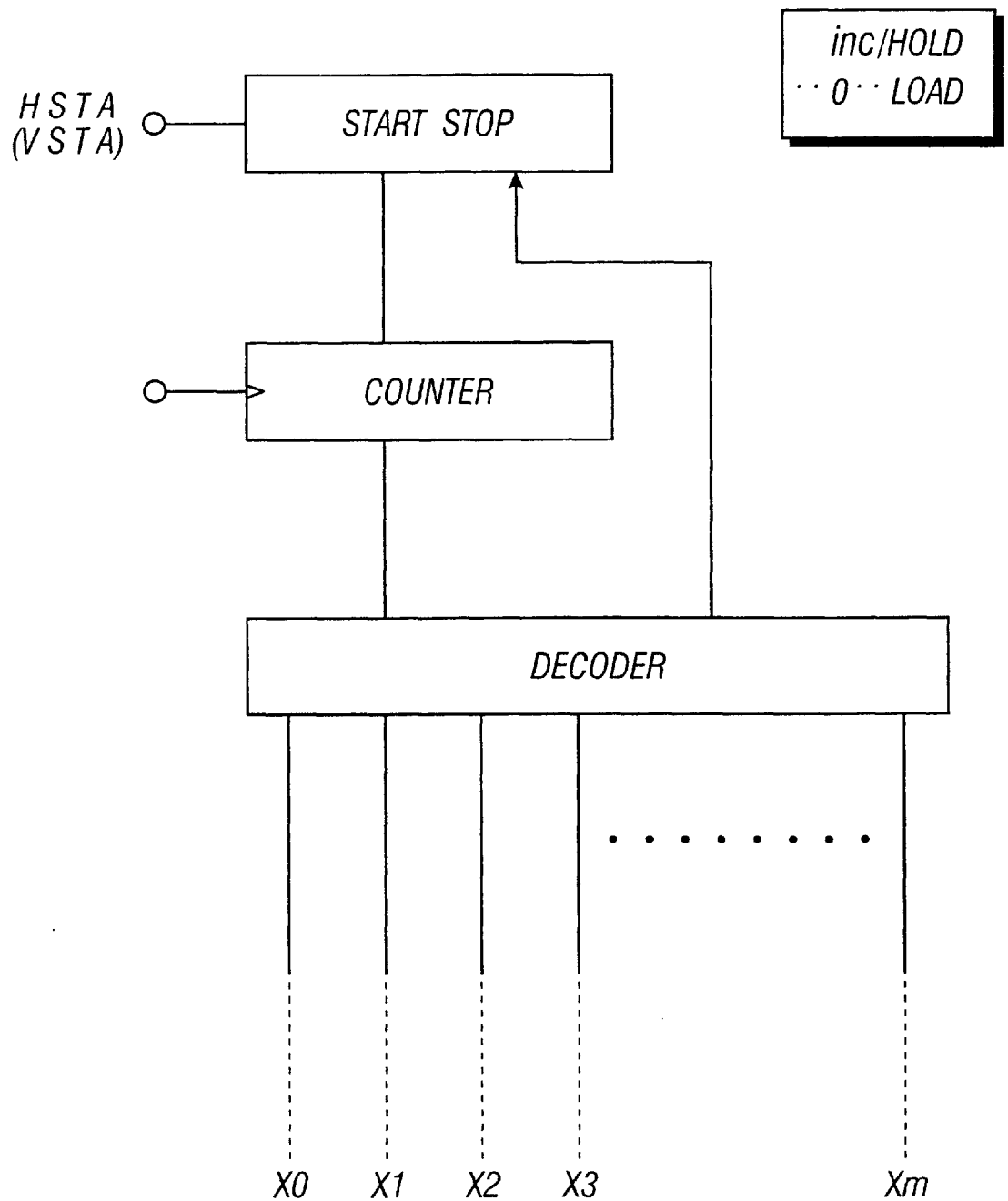
FIG. 23 is a circuit block diagram of another peripheral circuit for use in a display device according to the invention.

A circuit as shown in FIG. 23 can be used as one peripheral circuit such as the horizontal scanning control circuit 101 shown in FIG. 2. The fundamental operation of the active matrix region, or pixel region, 103 for providing a display of R shown in FIG. 2 is next described by referring to the timing chart of FIG. 3.

The clock pulses CLKH are used for control of the operation of the horizontal scanning control circuit 101. The clock pulses CLKV control the operation of the vertical scanning control circuit 109. These clock pulses CLKH and CLKV go high (H) and low (L) alternately at given intervals of time. Essentially, the timing of operation of the six active matrix circuits 103–108 is controlled by the clock pulses CLKH and CLKV.

First, flip-flop circuits are described. The flip-flop circuit 201 assumes two stable states. If the output Q of the flip-flop circuit 201 is at low (L) level, and if the input D is at high (H) level, the output Q goes high on one leading edge of the clock pulses CLKH. The level of the output Q is maintained high (H) unless the next leading edge of the clock pulses CLKH arrives. If the input level is at low (L) level, and if one leading edge of the clock pulses CLKH enters, the output Q is kept at low (L) level.

Figure 3:
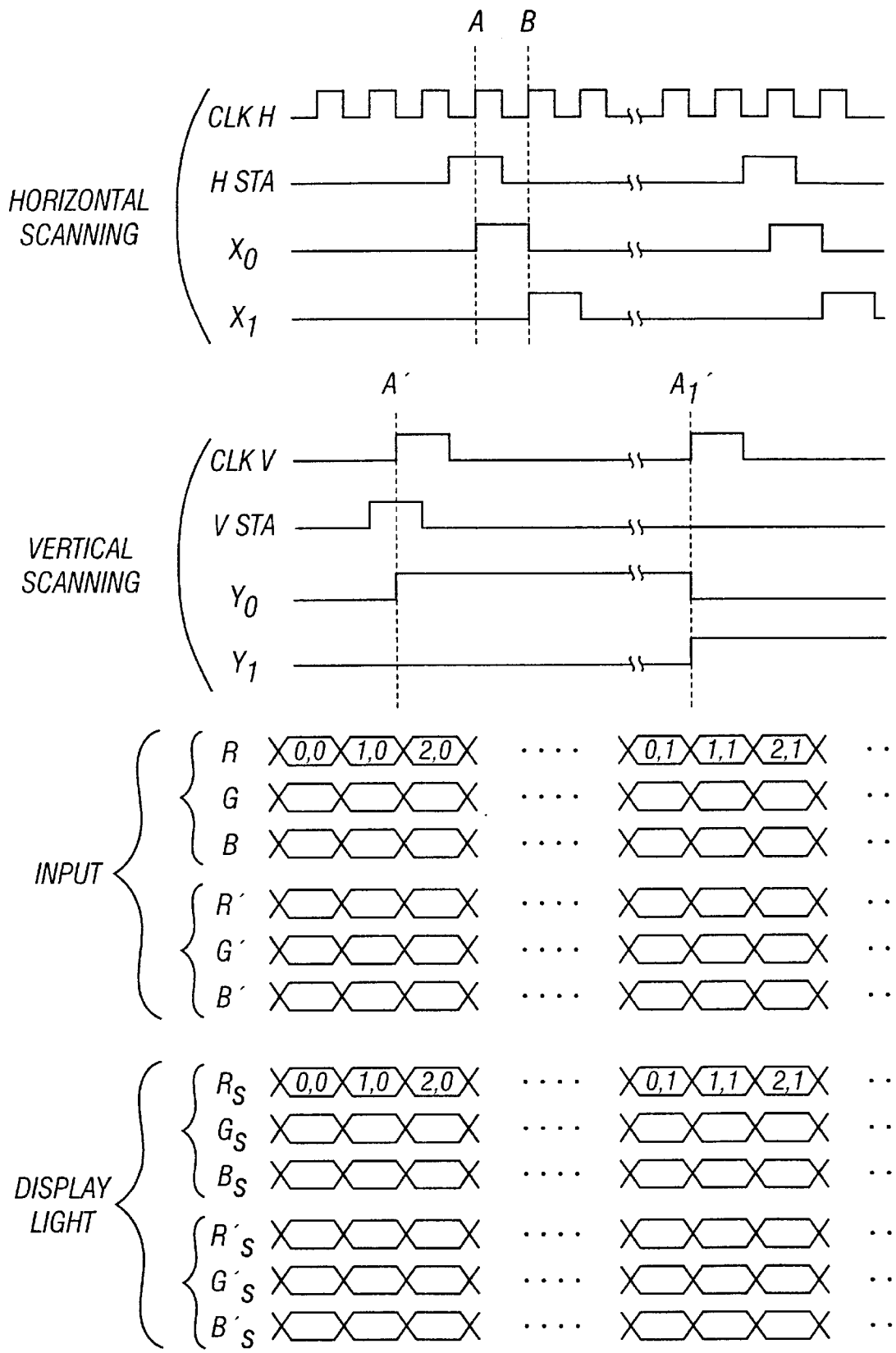
FIG. 3 is a timing chart illustrating the operation of the circuit shown in FIG. 2.

The operation is next briefly described by referring to FIG. 3. In FIG. 3, at instant A', in the flip-flop circuit 202 of the vertical scanning control circuit 109, one clock pulse CLKV at high level for the vertical scanning control overlaps the vertical scanning timing enable signal VSTA. As a result, the signal goes high (H) at instant $Y_0$.

Under this condition, the signal of the high (H) level is applied via the gate signal line 211 to the gates of the TFTs at the pixels in the $Y_0$ rows in the active matrix regions 103 and 106. This turns on the TFTs at the pixels in the $Y_0$ rows in the active matrix regions 103 and 106.

In the flip-flop circuit 202, when one clock pulse CLKV at high level for the vertical scanning control overlaps the vertical scanning timing enable signal VSTA, the input to the flip-flop circuit 203 assumes a low (L) level. Therefore, even if any leading edge of the clock pulses CLKV enters, the output from the flip-flop circuit 203 remains low (L). That is, at this instant, the row $Y_1$ takes low (L) level.

Similarly, at this instant (instant A'), the rows $Y_2, Y_3, \ldots, Y_n$ following the row $Y_1$ are at level L. That is, all the TFTs at the pixels in the active matrix regions 103 and 106 in the rows $Y_1, Y_2, Y_3, \ldots, Y_n$ are cutoff.

Specifically, at the instant A', one clock pulse CLKV at high level overlaps the vertical scanning timing enable signal VSTA, thus causing the $Y_0$ row to go high. The TFTs at addresses (0, 0), (1, 0), . . . , (m, 0) in the first row are turned on. Under this condition, all the TFTs located at addresses other than n=0 at the pixels having addresses (m, n) are turned off.

Then, in the flip-flop circuit 201 of the horizontal scanning control circuit 101, one leading edge of the clock pulses CLKH for the operation of the horizontal scanning control circuit overlaps a horizontal scanning timing enable signal HSTA. As a result, at instant $X_0$, the signal goes high (H). This instant is indicated by A in FIG. 2.

Under this condition, the output from a flip-flop circuit 206 is at low (L) level. That is, even if one leading edge of the clock pulses CLKH is applied to a flip-flop circuit 211, the output from the flip-flop circuit 211 is, of course, at low (L) level, because the $X_0$ row is at low level.

Likewise, the input and output signals to and from the flip-flop circuits following the flip-flop circuit 206 are all at low level. That is, the rows $X_1, X_2, \ldots, X_m$ are all at level L.

At the instant A shown in FIG. 2, a signal of high (H) level representing the signal level at $X_0$ is applied to the sample-and-hold circuit 204 via the image sampling signal line 208. Data about R image is accepted into the sample-and-hold circuit 204, and the image data is sent to the image signal line 209. As a result, a given signal voltage is applied to the sources of the TFTs at the pixel regions located at addresses (0, 0), (0, 1), (0, 2), . . . , (0, n) in the pixel regions.

At this time, i.e., at the instant indicated by A in FIG. 2, the TFTs at the addresses (0, 0), (1, 0), . . . , (m, 0) in the first row are conducting. It follows that pixels permitting information to be written into the liquid crystal in practice are pixels located at the address (0, 0). That is, at the instant A in FIG. 2, the information is written only at the address (0, 0).

In practice, there exists a time difference between the instant when the information is written and the instant when the information is displayed. Therefore, the information is entered, or written, and displayed at the timing shown in FIG. 3.

While only the pixel region 103 for displaying an R image has been described thus far, information is written at the addresses (0, 0) of the other five active matrix regions 104–108 on the same principle.

Then, at the instant B shown in FIG. 2, the next clock pulse CLKH is applied, thus causing the output from the flip-flop circuit 201 to go low (L). Therefore, the row $X_0$ goes low. At this instant B, clock pulse CLKH is applied when the input to the flip-flop circuit 206 is at high (H) level. Consequently, the output makes a transition from L to H. That is, the row $X_1$ goes high. In this state indicated by B in FIG. 2, the level of the row $Y_0$ remains H. That is, all the TFTs located at the addresses (0, 0), (1, 0), . . . , (m, 0) at the first row are conducting.

In response to the transition of the level of the row $X_1$ to H, a signal of H is applied to a sample-and-hold circuit 205 via an image sampling signal line 210. Data about the R image is accepted. A given signal voltage is applied to the sources of the TFTs at the pixel regions located at the addresses (1, 0), (1, 1), (1, 2), . . . , (1, n) in the pixel regions via the image signal line 210.

Under this condition, the TFTs in the row $Y_0$ are conducting and so information is written to the pixels located at the address (1, 0). At this time, information is written also into the pixels at the same address (1, 0) in the other five pixel regions 104–108.

In this way, information is sequentially written to the pixels at the zeroth row (the first row at the top stage of each region indicated by 103–108) located at the addresses (0, 0), (1, 0), (2, 0), . . . , (m, 0).

The above-described operations are repeated until writing of information at the address (m, 0) is complete. At this instant, the next clock pulse CLKV (at the instant $A_1'$ shown in FIG. 2) is applied. This causes the output from the flip-flop circuit 202 to go high. At the same time, the output from the flip-flop circuit 203 goes high. That is, the level of the row $Y_1$ goes high. A signal voltage of H is applied to the gates of the TFTs in the row $Y_1$ via a gate signal line 207.

In the same way as in the case of the zeroth row, information is sequentially written into the pixels located at the addresses (0, 1), (1, 1), . . . , (m, 1) in the first row. This operation is also performed for the other pixel regions 104–108.

These operations are repeated to sequentially write information to (m×n) pixels located at addresses from (0, 0) to (m, n). Thus, one frame (also known as one field) ends. That is, formation of one frame of image is ended. Generally, 30 frames of image are successively displayed per second to display one full picture.

In the configuration shown in FIG. 2, the horizontal scanning control circuits 101 and 102 have the same circuit configuration and operate similarly at the same time. Also, the vertical scanning control circuits 109, 110, and 111 have the same circuit configuration and operate similarly and simultaneously. As described previously, the 6 pixel regions 103–108 are activated in synchronism. Thus, the displaying operation progresses.

The operation of the present example has the advantage that various methods of operation can be selected according to image data supplied to the active matrix regions. For example, defect compensation, high-brightness display, display with high information content, three-dimensional display, and other kind of display can be selected by varying the image data supplied to the active matrix regions.

EXAMPLE 2

Figure 4A:
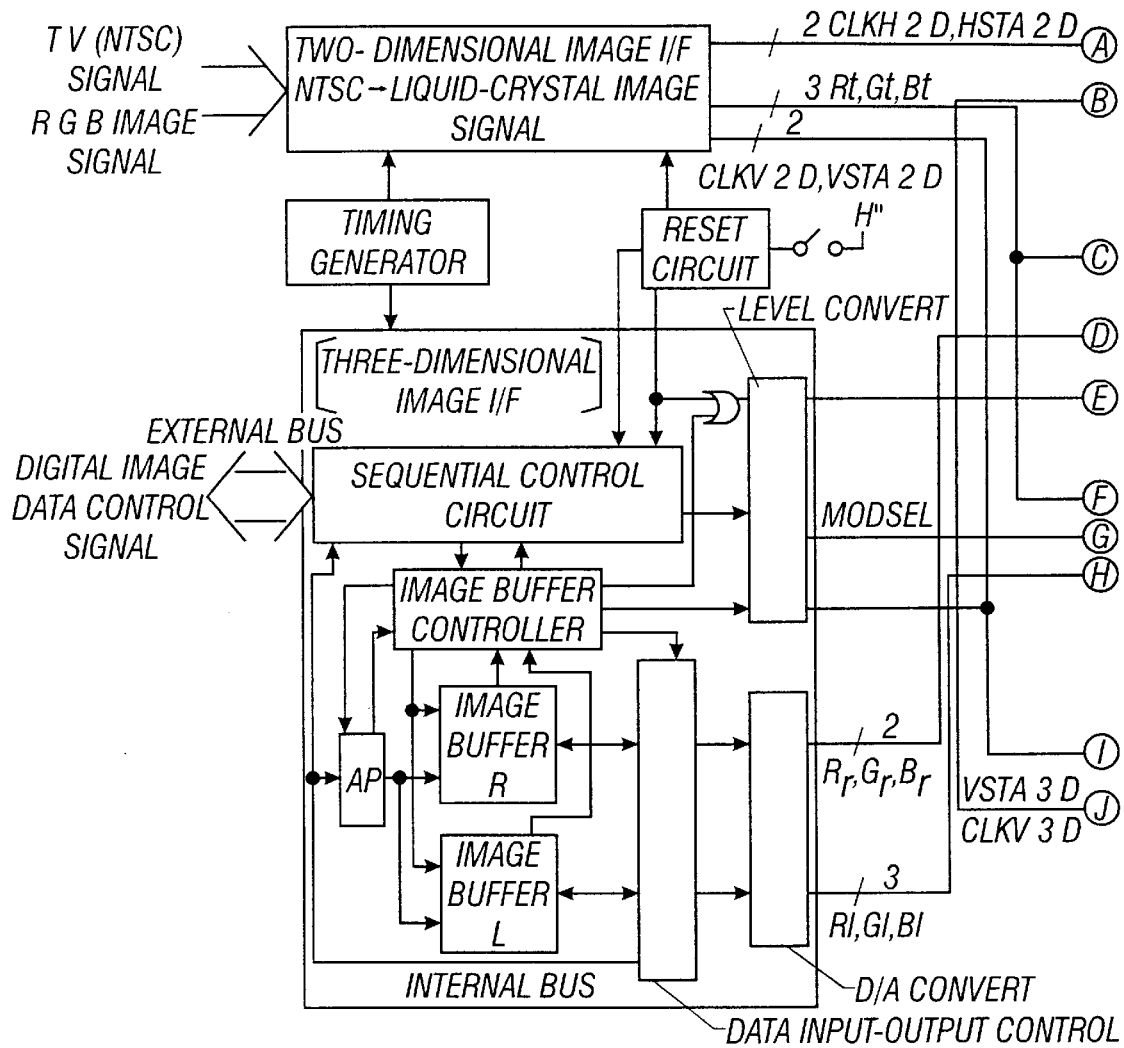
FIG. 4 is a schematic block diagram of circuitry used for displaying images, the circuitry being included in a device according to the invention.
Figure 4B:
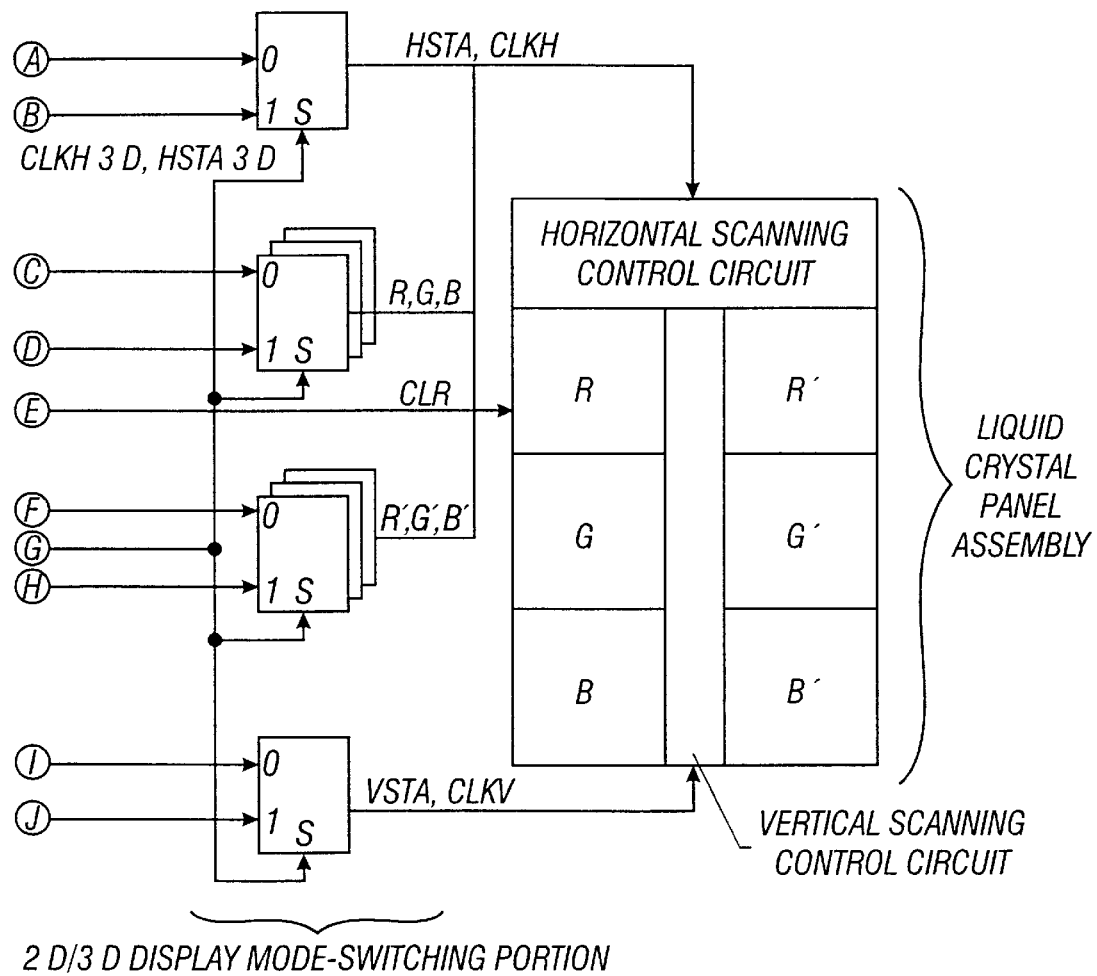

The present example pertains to a circuit configuration necessary to operate the integrated liquid crystal panel assembly shown in FIGS. 1 and 2. FIG. 4 is a block diagram schematically showing the configuration of the present example.

FIG. 4 shows the configuration for supplying image data to the configuration shown in FIG. 2. This configuration shown in FIG. 4 is designed to permit a two-dimensional image and a three-dimensional image to be selectively displayed. In FIG. 4, a two-dimensional interface (I/F) converts a two-dimensional TV signal (NTSC signal) applied from the outside or two-dimensional R, G, B image signals into image signals $R_t$, $G_t$, and $B_t$ synchronized with the system timing, and produces panel control signals HSTA2D, VSTA2D, CLKH2D, and CLKV2D for controlling the operation of the liquid crystal panel assembly. A timing generator produces clock pulses of a frequency governing the operation of the system, as well as clock pulses of divided frequencies. A reset circuit produces an initialization-forcing signal when the power supply is turned on, when any switch is operated, or when a request from a sequencer is made.

A three-dimensional interface (I/F) produces image data written to image buffers R and L in synchronism with the rate of operation of the liquid crystal panel assembly, together with control signals. The analog image data from the three-dimensional interface is fed to a D/A converter which converts the analog data into digital form.

A sequential control circuit interprets commands entered from an external bus and writes them into image memories or establishes a readout mode. The sequential control circuit also acts to confirm the operation according to results of a reading operation and performs processing at a Reset request.

An image buffer controller writes data into the image buffer memories at a request from the sequence control circuit. Furthermore, the image buffer controller controls the manner in which image data is sent out in synchronism with the rate of the clock pulses for the liquid crystal panel assembly.

An address pointer (AP) is a pointer indicating physical addresses in the image buffer memories. In this example, the address pointer is incremented or otherwise controlled by the image buffer controller.

A three-dimensional interface (I/F) is designed to generate two sets of RGB signals for the right and left eyes, respectively. Therefore, the two sets of RGB signals are essentially different from each other. Of course, they may contain common portions.

If these two sets of RGB signals are exactly the same, it follows that two identical images are made to overlap each other. Accordingly, a normal two-dimensional image data is displayed, but the obtained two-dimensional image has higher brightness and higher information content.

In FIG. 4, indicated by CKLH2D are clock pulses for the operation of horizontal scanning control circuits for two-dimensional display. Indicated by HSTA2D is a horizontal scanning timing enable signal for providing a two-dimensional display. Indicated by CKLH3D are clock pulses for the operation of horizontal scanning control circuits for three-dimensional display. Indicated by HSTA3D is a horizontal scanning timing enable signal for three-dimensional display.

$R_t$, $G_t$, and $B_t$ indicate data about a two-dimensional image such as a normal TV picture. Indicated by CLKV2D are clock pulses for the operation of vertical scanning control circuits for providing a two-dimensional display. Indicated by VSTA2D is a vertical scanning timing enable signal for providing a two-dimensional display.

A mode selector MODSEL acts to switch the mode of operation between a two-dimensional display mode and a three-dimensional display mode. In the illustrated configuration, this mode selector is not operated, and the system is so set up that it operates in the two-dimensional display mode.

Indicated by VSTA3D is a vertical scanning timing enable signal for providing a three-dimensional display. Indicated by CLKV3D are clock pulses for the operation of vertical scanning control circuits for providing a three-dimensional display.

$R_r$, $G_r$, and $B_r$ indicate RGB image data for the right eye. $R_1$, $G_1$, and $B_1$ indicate RGB image data for the left eye. A reset signal CLR resets the circuitry in the liquid crystal panel assembly. In FIG. 2, conductive interconnects for transmitting the reset signal CLR are omitted for simplicity. In practice, conductive interconnects are formed so that the reset signal CLR is transmitted to the flip-flop circuits.

In the configuration shown in FIG. 4, an image signal is selected by a two-dimensional (2D)/three-dimensional (3D) display mode-switching portion, so that two-dimensional display and three-dimensional display are selectively provided. That is, two-dimensional and three-dimensional displays can be selectively provided on a single display unit. For instance, a normal TV picture sent in analog form can be displayed. Also, a three-dimensional computer graphic image sent in digital form can be displayed.

EXAMPLE 3

The present example pertains to a projection display system making use of the integrated liquid crystal panel shown in FIGS. 1 and 2. A screen 510 is mounted inside a display enclosure 500. An image is projected from inside the enclosure onto this screen 510 so that an expanded image is created on the screen.

In this example, the system is a rear-projection system, where the image is viewed from the opposite side of the screen as that on which it is projected. A front-projection system, where the image is viewed from the same side of the screen as that on which it is projected, is similar to the rear-projection system in fundamental structure except that the image is inverted. It is to be noted, however, that in either projection system, the screen is not integral with the enclosure.

A two-dimensional/three-dimensional image control circuit 511 schematically shown in FIG. 4 is mounted in the enclosure 500. Two- and three-dimensional images can be selectively displayed.

Figure 5:
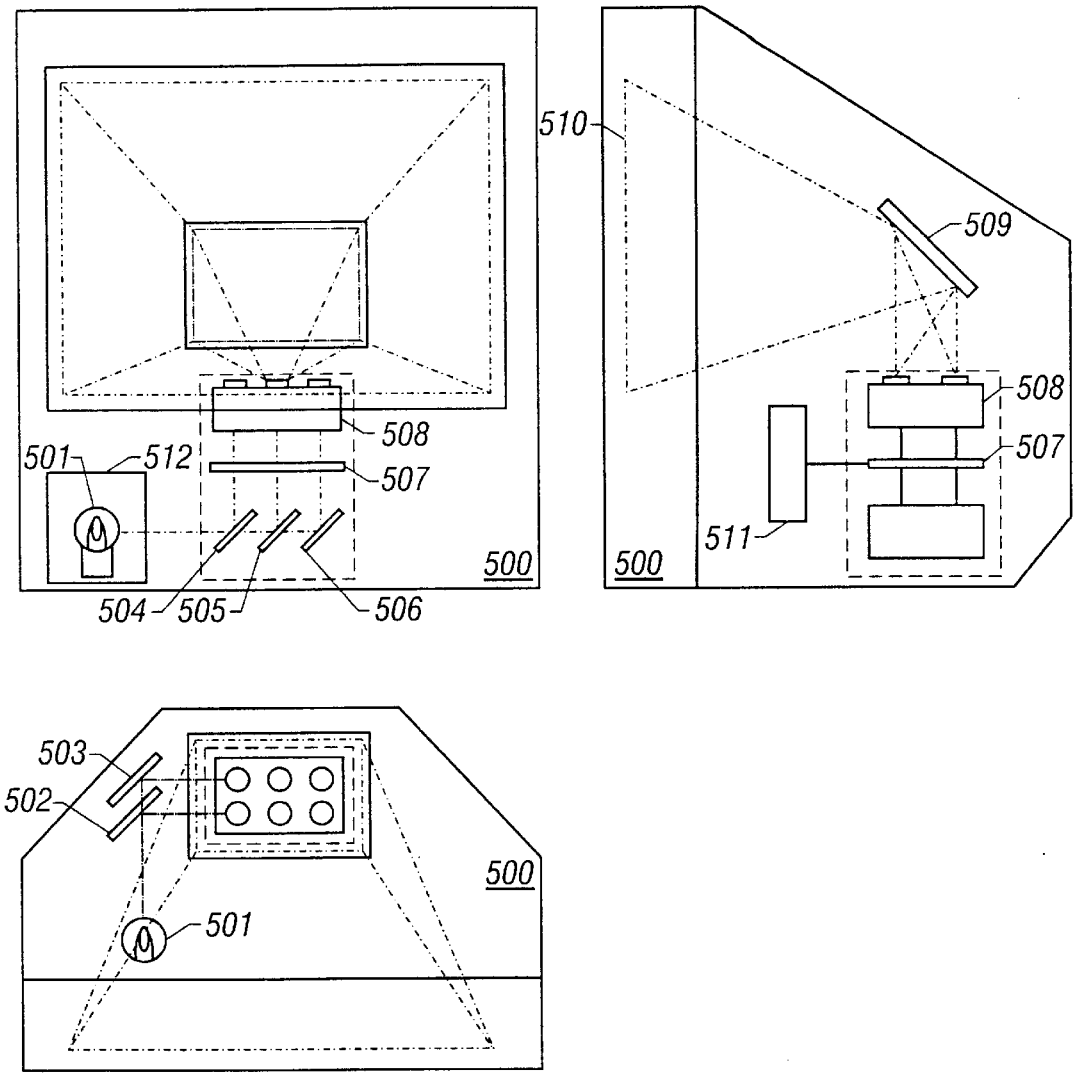
FIG. 5 is a schematic view of a projection display system according to the invention.

Referring to FIG. 5, white light emitted by a light source 501 is first reflected by a half mirror 502 and spectrally divided into different wavelengths of light corresponding to G (green), B (blue), and R (red), respectively, by dichroic mirrors 504, 505, and 506, respectively.

Light reflected by another mirror 503 is similarly spectrally divided into different wavelengths of light corresponding to B, G, and R, respectively, by dichroic mirrors (not shown). That is, the two sets of dichroic mirrors for R, G, and B produce two sets of light rays of R, B, and G, i.e., six light rays.

These light rays are incident on the integrated liquid crystal panel 507 which is schematically shown in FIGS. 1 and 2. The incident light rays are optically modulated by the integrated liquid crystal panel 507, thus creating two sets of images of R, G, and B. These images are then projected onto the screen 510 through optics 508 and a mirror 509. As a result, a composite color image is created on the screen.

The optics 508 include lenses for magnification of the projected image and polarizing means which are used when a three-dimensional display is provided. Normally, polarizing plates are used as the polarizing means. In the case of normal two-dimensional display, the polarizing means merely act as light attenuation means. Accordingly, the polarizing means does not present any obstacle except that the illuminance of the displayed image drops. However, if it is desired to enhance the illuminance in two-dimensional display mode, the polarizing means may be designed so that it can be mechanically moved off the optical axis.

EXAMPLE 4

The present example is a configuration which is similar to the configuration of Example 3 except that two images of RGB are made to overlap each other by making images created with R, G, B equal to images created with R', G', B', respectively.

This configuration is characterized in that if a slight amount of defects is present in the pixel regions, the displayed image is prevented from suffering from clearly visible defects. That is, it is unlikely that any pixel fails to be activated. For example, in the case of one set of pixel regions with R and R', G and G', and B and B', it is hardly likely that plural defects exist in the same pixel region. Therefore, if any pixel in the R pixel region is defective, the corresponding pixel portion in the composite image is activated though imperfectly unless the corresponding pixel in the R' pixel region is defective.

In the integrated liquid crystal panel configuration shown in FIG. 2, horizontal and vertical scans are controlled by the common signals (HSTA, CLKH, VSTA, and CLKV). Therefore, two RGB images can be combined into one without requiring any structure for synchronizing the various active matrix regions.

EXAMPLE 5

In the present example, a three-dimensional display is provided, by making use of the display system of Example 3. In the display system described already in connection with FIG. 5, the polarizing means is disposed in each optical path of the optics 508.

This polarizing means polarizes each image of R, G, B from the liquid crystal panels such that each image assumes the same polarized state. Each image is created by each of the active matrix regions 103–105 shown in FIGS. 1 and 2. However, the polarizing means polarizes each image of R', G', B' created by the active matrix regions 106–108 shown in FIGS. 1 and 2 differently from the images of R, G, B.

More specifically, the images of R, G, and B are all right-handedly circularly polarized. The images of R', G', and B' are all circularly polarized similarly but left-handed. The images of R, G, and B are linearly polarized and oriented in the same direction. The images of R', G', and B' are linearly polarized and oriented in a direction shifted by 90 degrees from the above-described direction.

Where a three-dimensional image is to be displayed, a color image for the right eye is created from R, G, and B by the integrated liquid crystal panel 507. A color image for the left eye is created from R', G', and B' also by the panel 507. This operation is controlled by the three-dimensional image interface included in the two-dimensional/three-dimensional image control circuit shown in FIG. 3.

If this operation is carried out, the RGB color image is adapted for the right eye and right-handedly circularly polarized. The R'G'B' color image is adapted for the left eye and left-handedly circularly polarized. These images are combined into one on the screen 510 (see FIG. 5).

If this composite image is simply viewed, it is a simple superimposition of the images for the right and left eyes, respectively. However, if the observer wears special goggles, then the observer can view the two separate color images with his or her two eyes, respectively.

In particular, a filter for transmitting only left-handedly polarized light is placed in the right eye portion of the goggles. If this filter encounters with right-handedly polarized light, left-handedly polarized light is produced. A filter for transmitting only right-handedly polarized light is positioned inside the left eye portion of the goggles. The observer views the screen 510 (FIG. 5) while wearing the goggles designed in this way.

Thus, the observer can view only the image for the right eye with the right eye and only the image for the left eye with the left eye. In this way, the observer can recognize a three-dimensional image.

The optics 508 linearly polarize each image of RGB in the same given direction. The optics linearly polarize each image of R'G'B' in the direction differing by 90° from the given direction. In this case, a polarizer filter for transmitting the aforementioned linearly polarized light in the given direction is disposed in the right eye portion of the goggles. A polarizer filter for transmitting the linearly polarized light in the direction which is rotated through 90° from the given direction is positioned in the left eye portion of the goggles. In this scheme, the observer can view only the image for the right eye with the right eye and only the image for the left eye with the left eye. Consequently, the observer can recognize a three-dimensional image.

As described thus far, a two-dimensional image and a three-dimensional image can be selectively displayed, by the use of the display system shown in FIG. 5 or the display device shown in FIGS. 1–3. Since it is not necessary to prepare a display device for two-dimensional images and a display device for three-dimensional images separately, this system is quite useful.

EXAMPLE 6

Figure 6:
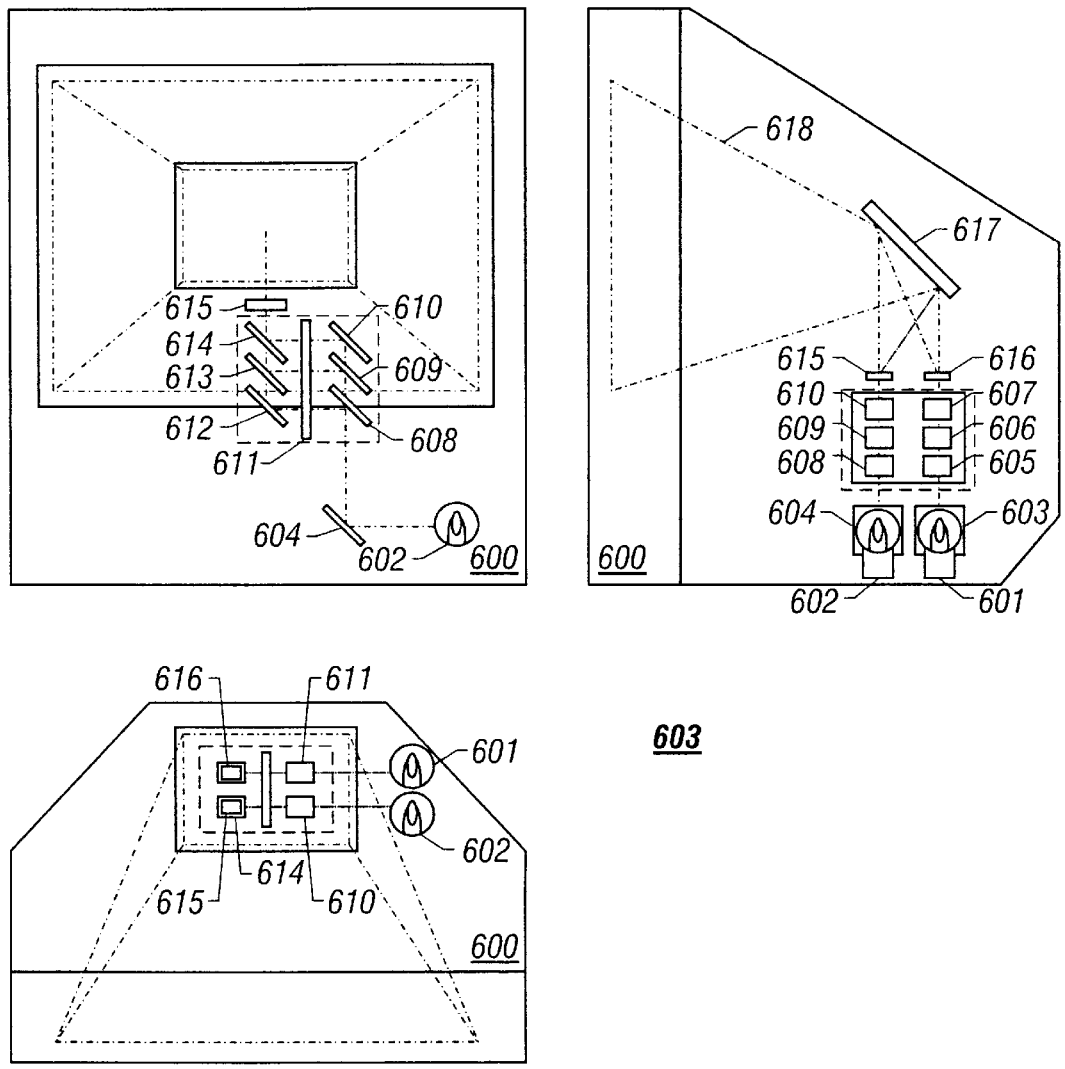
FIG. 6 is a schematic view of another projection display system according to the invention.

The present example pertains to a display system for displaying a three-dimensional image through the use of optics different from the optics shown in FIG. 6. The configuration of the present example is schematically shown in FIG. 6 and uses an integrated liquid crystal panel 611 having six pixel regions, or active matrix regions, of the structure shown in FIGS. 1 and 2 to form two color images of RGB. These two images are projected onto a screen 618 to create a composite image. One image of RGB is adapted for the right eye, while the other is adapted for the left eye. The composite image is viewed through special goggles, whereby the observer can recognize a three-dimensional image.

Referring to FIG. 6, light from a first light source 602 is reflected by a mirror 604 and spectrally divided into wavelength regions of light corresponding to G, B, and R, respectively, by dichroic mirrors 608, 609, and 610, respectively. These wavelengths of light enter the integrated liquid crystal panel 611 shown in FIGS. 1 and 2.

The light is optically modulated in the pixel regions of the integrated liquid crystal panel 611 corresponding to R, G, and B. The image of G is reflected to a mirror 612. The image of B is reflected by a half mirror 613. The image of R is reflected by a half mirror 614.

The resulting composite color image is passed through optics 615, reflected by a mirror 617, and projected onto the screen 618. The optics 615 include lenses necessary for expanded projection, as well as means for polarizing the light circularly or linearly in the given direction.

Light from another light source 601 is reflected by a mirror 603 and spectrally divided into different wavelengths of light corresponding to G, B, and R, respectively, by dichroic mirrors 605, 606, and 607, respectively. These wavelengths of light are optically modulated by the integrated liquid crystal panel 611. The optically modulated wavelengths of light are combined into one by mirrors (not shown) and projected onto the screen 618 via optics 616 and the mirror 617.

The optics 616 are equipped with a means for circularly polarizing the light in a direction different from the direction of polarization imparted by the polarizing means disposed in the optics 615. Alternatively, the optics are equipped with a means for linearly polarizing the light in a direction differing from the former direction by 90°. Accordingly, the two color images of RGB projected from the optics 616 and 617 are circularly polarized in different directions or linearly polarized in directions which differ by 90°. Consequently, the observer can view a color image for the right eye and a color image for the left eye independently by viewing the screen 618 through goggles equipped either with filters for transmitting images of circularly polarized light in different directions for the two eyes or with filters for transmitting images of linearly polarized light in directions differing by 90°.

As described in Example 1, the liquid crystal panel assembly shown in FIGS. 1 and 2 is capable of creating two different color images. By utilizing this, an image for the right eye and an image for the left eye are projected onto the screen 618. The projected images are viewed with the two eyes, respectively, on the principle described above. As a consequence, a three-dimensional image can be perceived.

Figure 8:
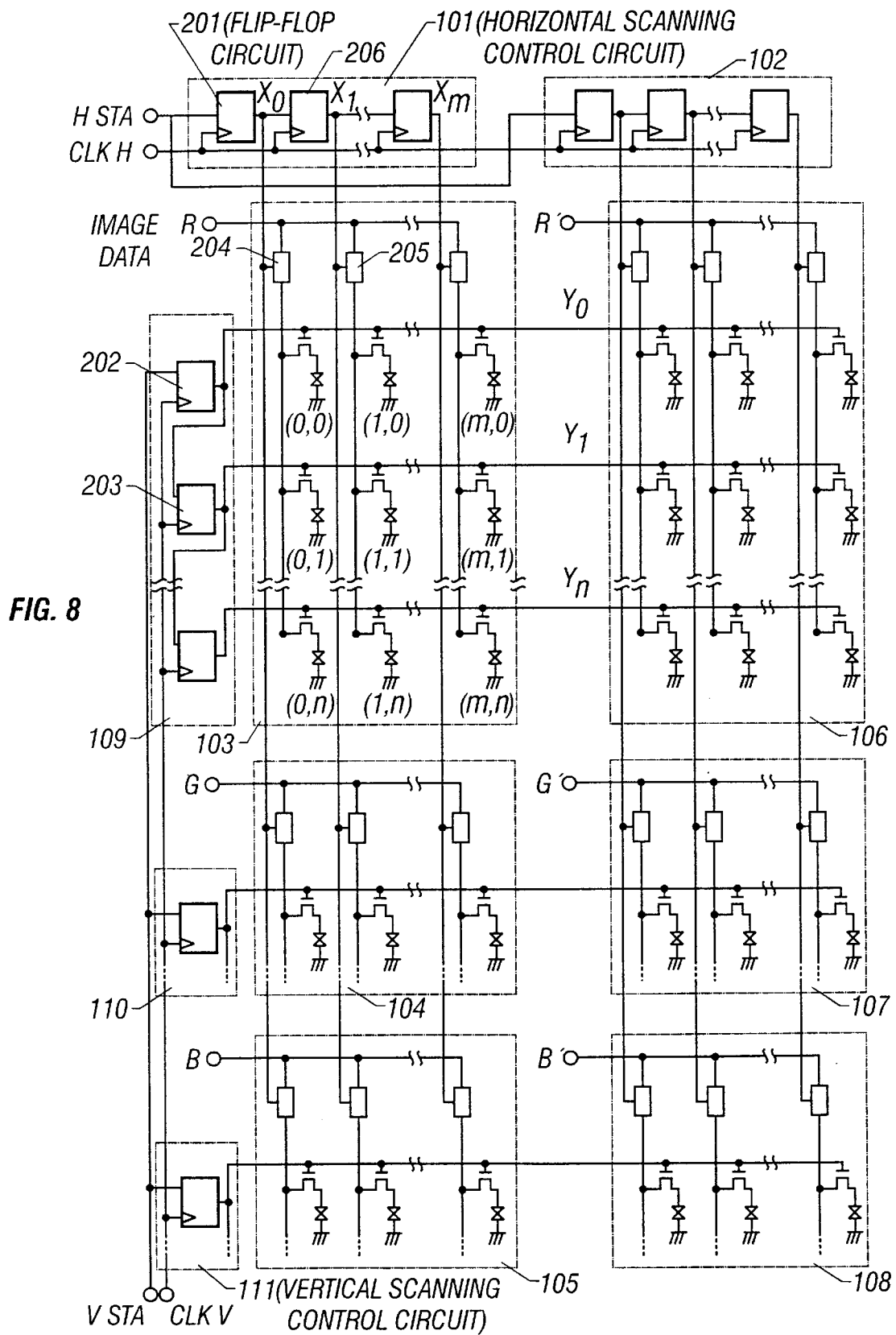
FIG. 8 is a schematic circuit block diagram of another integrated active matrix circuit according to the invention.

The structure shown in FIG. 8 can be used for a normal two-dimensional display. In this case, one set of images of RGB is created. They are simply combined into one on the screen.

EXAMPLE 7

The present example for providing a three-dimensional display is similar to the structure shown in FIG. 6 except that the screen 618 consists of a lenticular screen. The present example is schematically shown in FIG. 7, where images emerging from two sets of optics 711 and 712 are projected onto a double lenticular screen 714, thus displaying a three-dimensional image.

In the configuration shown in FIG. 7, one color image is created by the light from a light source 701. The light from the light source 701 is reflected by a mirror 703 and separated into G, B, and R by dichroic mirrors (not shown). The separated R, G, and B are optically modulated by a liquid crystal panel assembly of a structure similar to the structure shown in FIGS. 1 and 2.

The first color image of RGB and the second color image of R'G'B' enter the optics 711 and 712, respectively. The images are reflected by a mirror 713 and projected onto the double lenticular screen 714.

The image projected onto the double lenticular screen 714 can be recognized as a three-dimensional image by appropriately setting the spacing between the optical axes of the first and second color images.

EXAMPLE 8

The present example is equivalently the same as the configuration shown in FIG. 2 but the circuit arrangement has been modified. FIG. 8 is a block diagram schematically showing the circuit arrangement in the integrated liquid crystal panel of the present example. Like components are indicated by like reference numerals in both FIGS. 2 and 8.

The configuration shown in FIG. 8 is different from the arrangement of the vertical scanning control circuits 109, 110, and 111. The method of operation is the same as the method of operation of the structure shown in FIG. 2.

Figure 9:
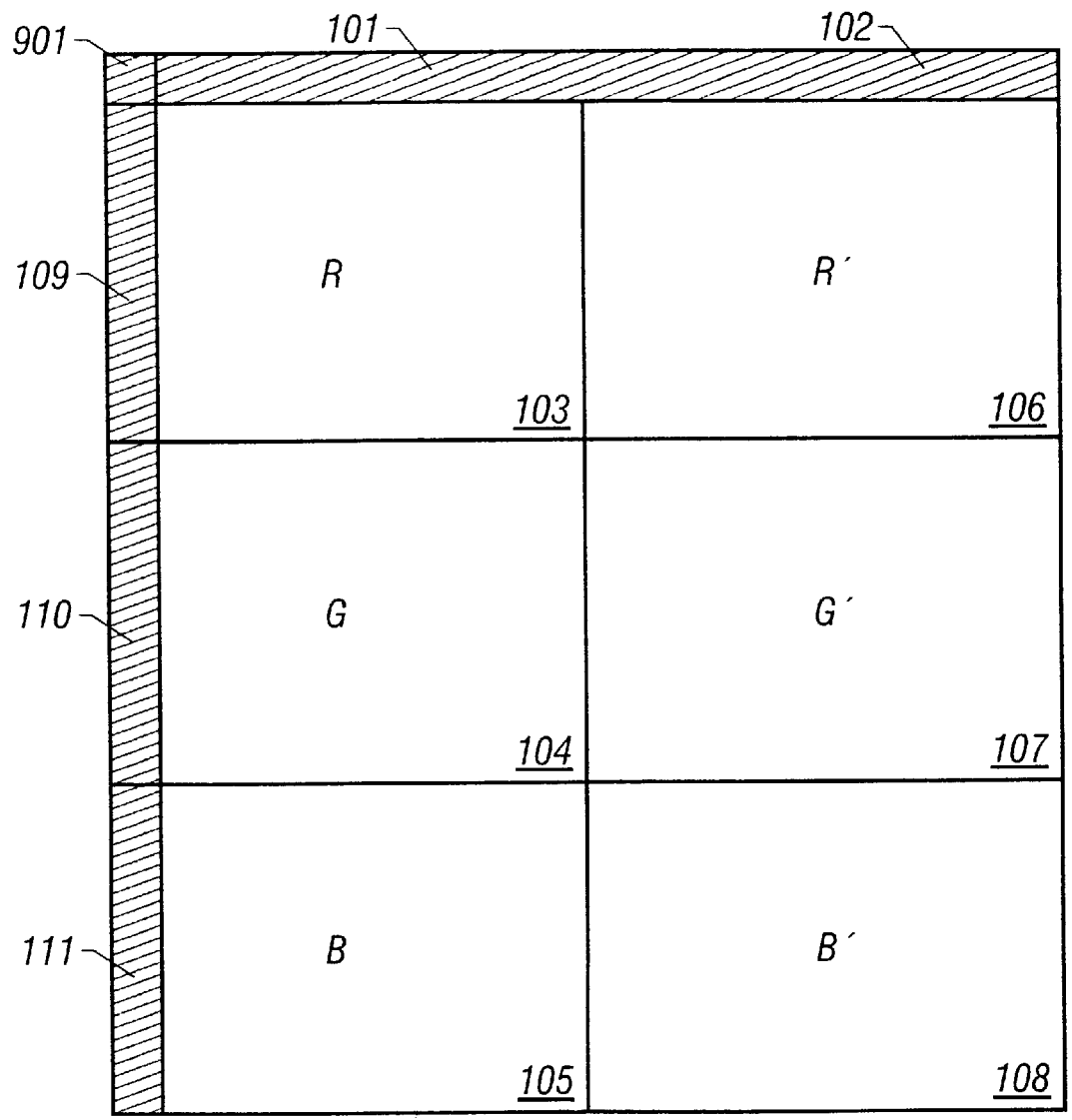
FIG. 9 is a schematic view of another integrated active matrix circuit according to the invention.

The actual arrangement of circuits of the configuration shown in FIG. 8 is shown in FIG. 9, where the circuits are packed at a high density in such a way that little spacing is left between them. A region 901 is equipped with an input portion for receiving data about image of RGB, data about image of R'G'B', and the common signals HSTA, CLKH, VSTA, and CLKV.

EXAMPLE 9

Figure 10:
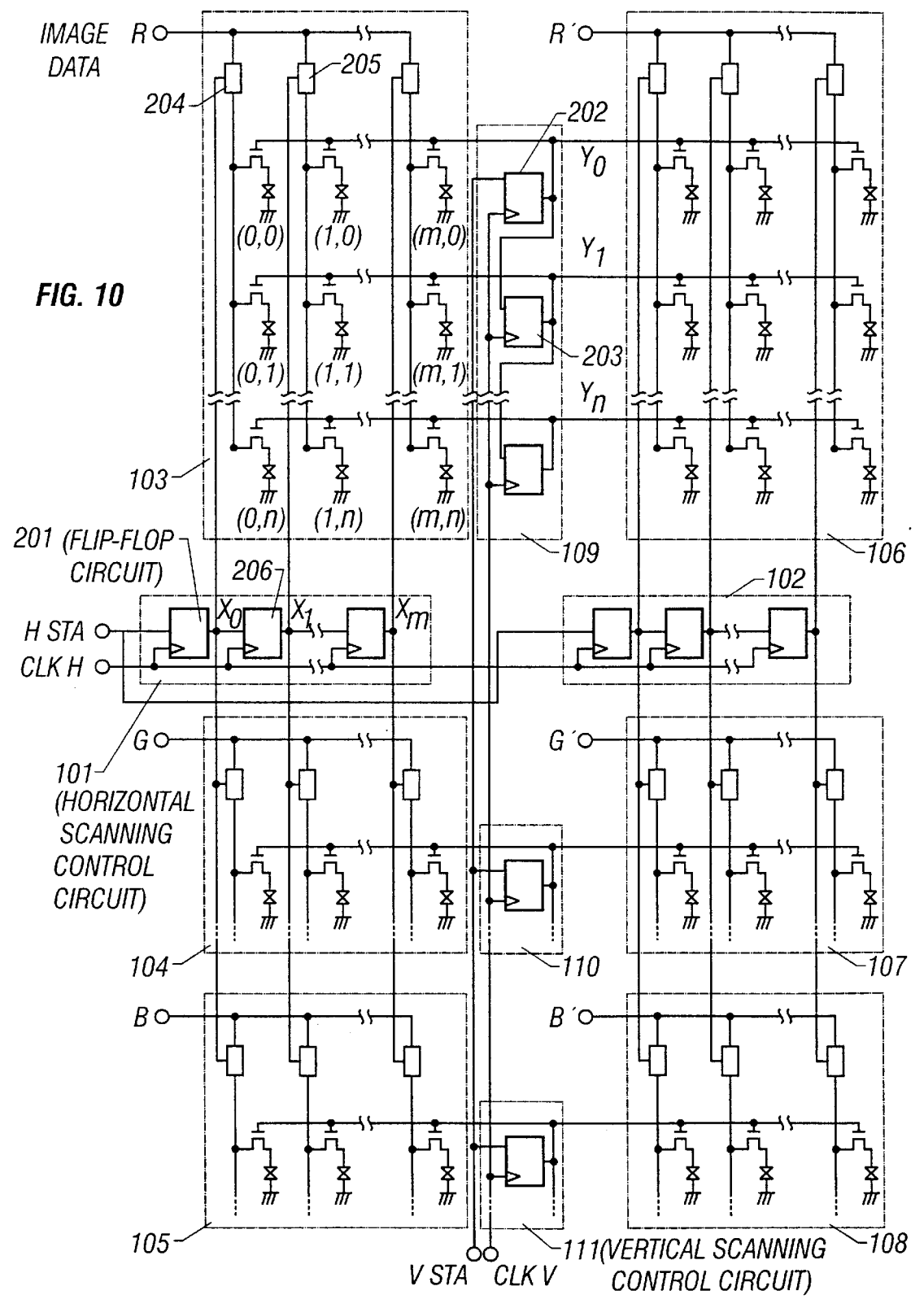

The present example is equivalently the same as the configuration shown in FIG. 2 but the circuit arrangement has been modified. FIG. 10 is a block diagram schematically showing the circuit arrangement in the integrated liquid crystal panel of the present example. Like components are indicated by like reference numerals in both FIGS. 2 and 10.

The configuration shown in FIG. 10 is different from the arrangement of the vertical scanning control circuits 109, 110, and 111. The method of operation is the same as the method of operation of the structure shown in FIG. 2.

Figure 11:
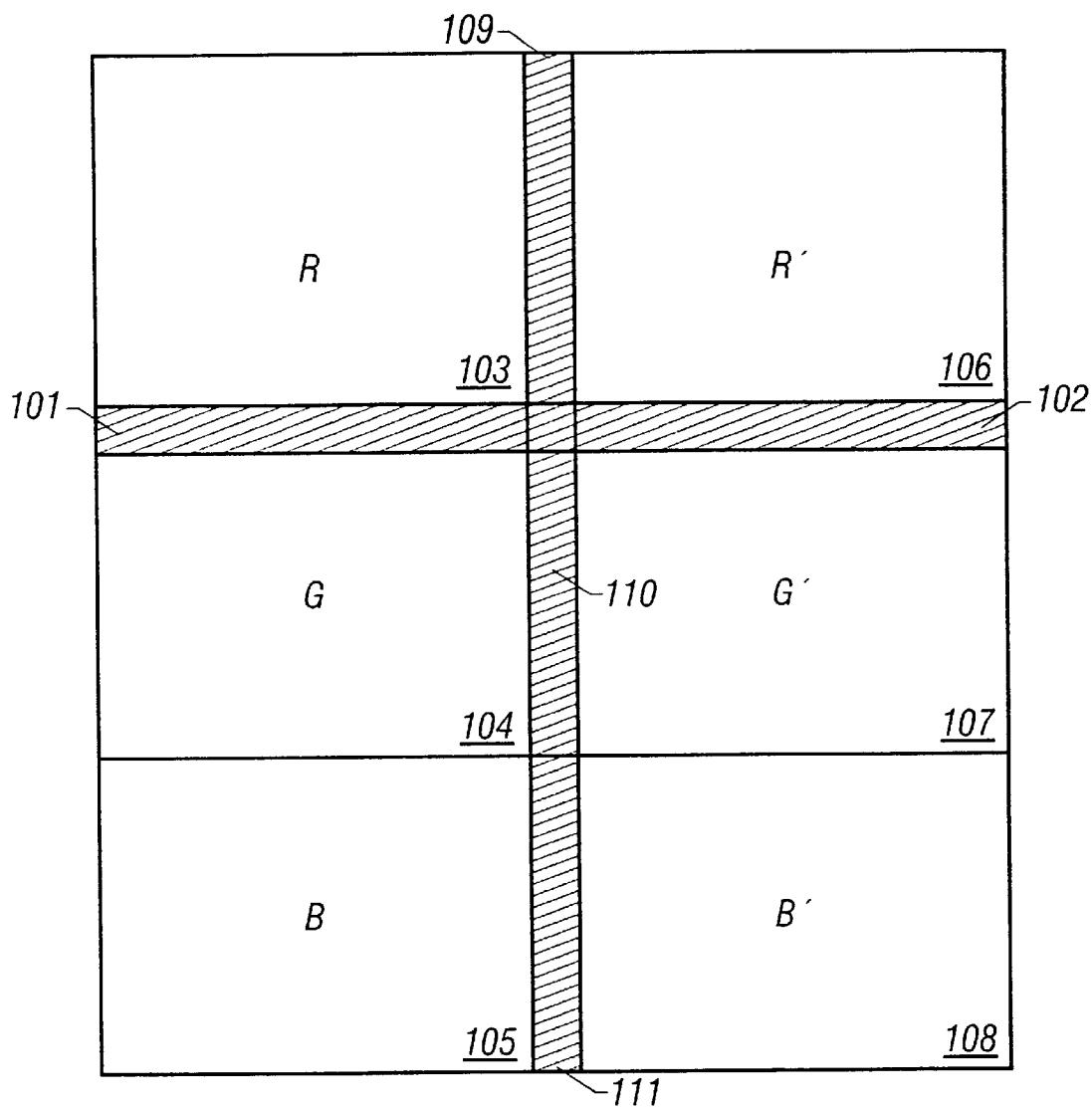
FIG. 11 is a schematic view of a further integrated active matrix circuit according to the invention.

The actual arrangement of circuits of the configuration shown in FIG. 10 is shown in FIG. 11, where the circuits are packed at a high density so that little spacing is left between them. In this structure, the horizontal and vertical scanning control circuits (collectively referred to as peripheral circuitry) packed at a high density can be spaced widely from the fringes of the substrate. Hence, the production yield can be enhanced.

Generally, in steps for fabricating circuits and devices on a substrate, the density of dust near the fringes of the substrate is higher than in the center. Therefore, the probability of occurrence of defects near the fringes of the substrate is higher. However, if the circuit arrangement shown in FIGS. 10 and 11 is adopted, the horizontal and vertical scanning control circuits which tend to produce defects in the presence of dust can be spaced widely from the fringes of the substrate. Consequently, the occurrence of defects of the whole system can be suppressed.

EXAMPLE 10

FIG. 2 shows a structure for creating two color images of RGB and R'G'B', respectively. In particular, active matrix regions 103–105 form images of RGB. Active matrix regions 106–108 form images of R'G'B'.

However, if one desires to overlap further images, other pixel arrangement such as 3×3 or 3×4 is necessary rather than the 3×2 pixel arrangement shown in FIG. 2. For example, the 3×3 arrangement can consist of RGB, R'G'B', and R"G"B". The 3×4 arrangement can consist of RGB, R'G'B', R"G"B", and R'"G'"B'".

For example, the 3×4 arrangement would be attained by simply arranging two liquid crystal panel assemblies shown in FIG. 2. However, the number of the horizontal and vertical scanning control circuits is doubled proportionately. Hence, the configuration is simply complicated. Since the other liquid crystal panel assembly is built, using other substrate, the optical axis alignment and position alignment will be more complex to perform.

Accordingly, in the present example, three active matrix regions for forming an image of R"G"B" are added to the structure of FIG. 2. As a result, 3×3 active matrix regions are integrated on the same substrate, thus giving rise to an integrated liquid crystal panel.

Figure 12:
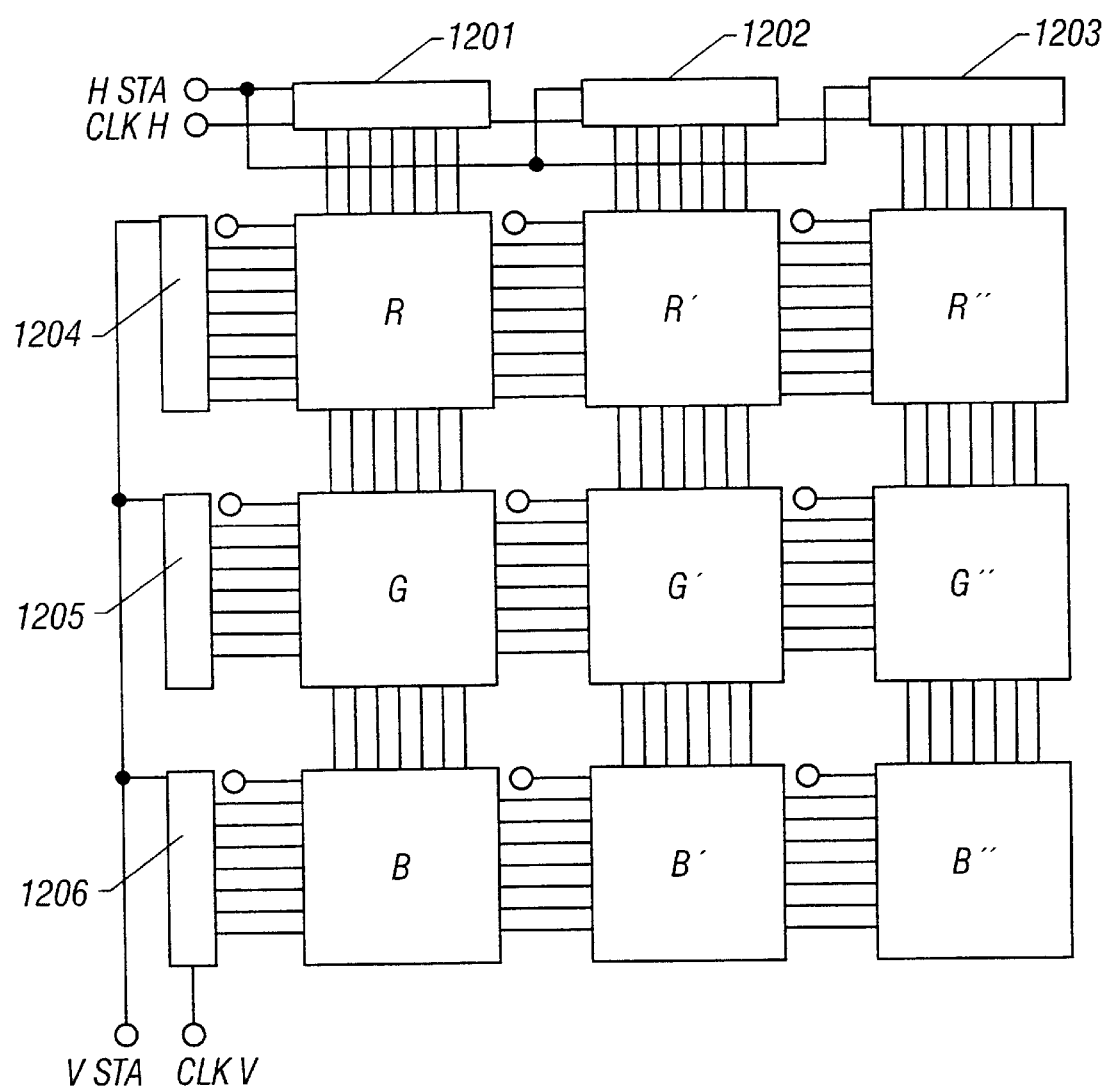
FIG. 12 is a schematic circuit block diagram of a still other integrated active matrix circuit according to the invention.

FIG. 12 is a block diagram showing the circuit arrangement of the liquid crystal panel assembly of the present invention. In the schematic view of FIG. 12, there are shown horizontal scanning control circuits 1201, 1202, and 1203. For example, the horizontal scanning control circuit 1201 controls image data signal supplied to the active matrix regions for forming images of RGB. Also shown are vertical scanning control circuits 1204, 1205, and 1206. For instance, the horizontal scanning control circuit 1201 controls the supply of signals to the gate signal lines connected with the active matrix regions for creating images of R, R', and R".

In the configuration shown in FIG. 12, the vertical scanning control circuit 1204 is shared among the three active matrix regions for creating images of R, R', and R". The horizontal scanning control circuit 1201 is shared among the three active matrix regions for creating images of RGB.

It is not necessary for the configuration shown in FIG. 12 to have a greater number of vertical scanning control circuits. On the other hand, the number of scanning control circuits is greater than the number of scanning control circuits of the configuration of FIG. 2 by only one.

Specifically, three active matrix regions are added. That is, the area is increased by 50%. However, only one peripheral circuit is added. The area is increased by 20%. This offers the great advantage of simplifying the structure. This in turn contributes to a decrease in the fabrication cost. Also, the reliability is enhanced. Furthermore, low electric power consumption is accomplished.

Figure 13:
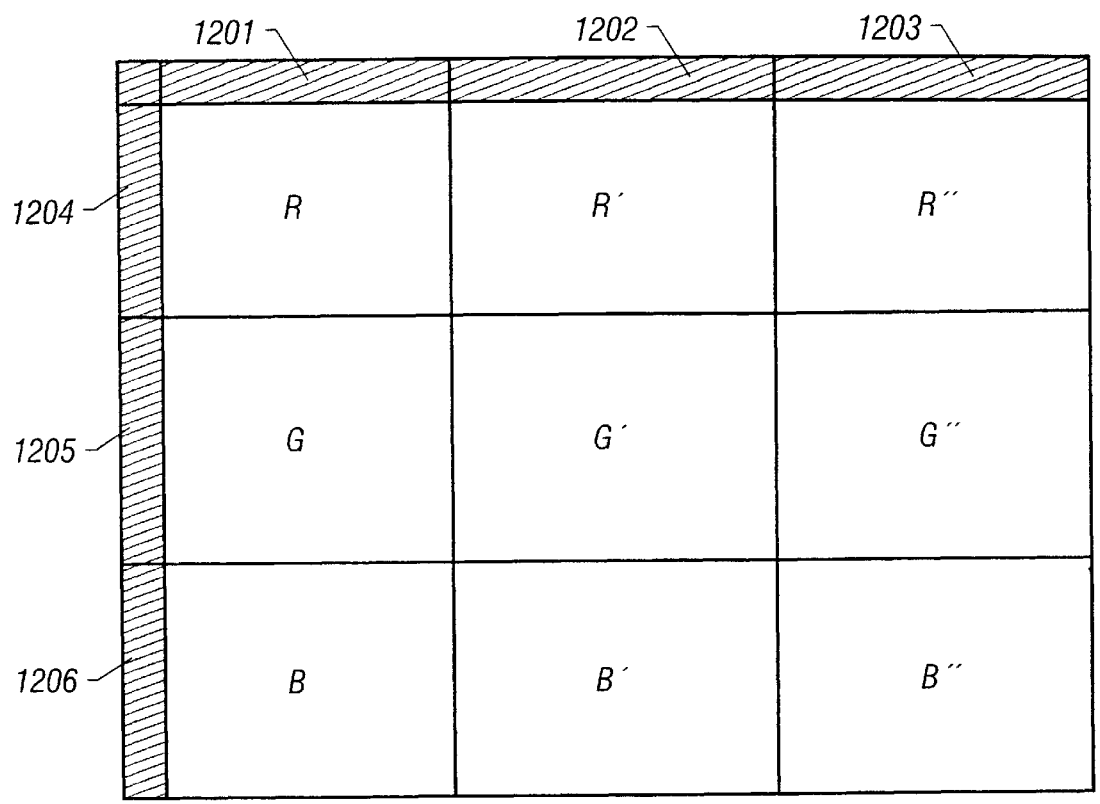
FIG. 13 is a schematic view of a yet other integrated active matrix circuit according to the invention.

The actual arrangement of the circuits shown in FIG. 12 is shown in FIG. 13. As shown in FIG. 13, active matrix regions for forming images of RGB, R'G'B', R"G"B", horizontal scanning control circuits 1201–1203, and vertical scanning control circuits 1204–1206 are integrated. Although substantially nine liquid crystal panels are integrated, the whole structure can be made simple.

Specifically, if the number of the active matrix regions is M×N, the number of the peripheral circuits is only M+N, because each peripheral circuit is used for plural active matrix regions. Accordingly, if the number of active matrix regions to be integrated is increased, the configuration is not complicated proportionately. This advantage becomes more conspicuous where the number of active matrix regions to be integrated is increased. M and N are natural numbers satisfying the conditions $M \geq 2$, $N \geq 3$.

EXAMPLE 11

Example 10 is the case where the number of color images of RGB set is increased further. It is also necessary to increase the number of active matrix region for other purposes. For example, a composite color image with a high resolution is formed by adding at least one of a white (W) image and a yellow (Y) image to images of RGB and utilizing the resulting images.

In this case, it is necessary to superimpose four or five images. That is, 4×2 or 5×2 active matrix arrangement is necessary instead of the 3×2 active matrix arrangement shown in FIG. 2.

Figure 14:
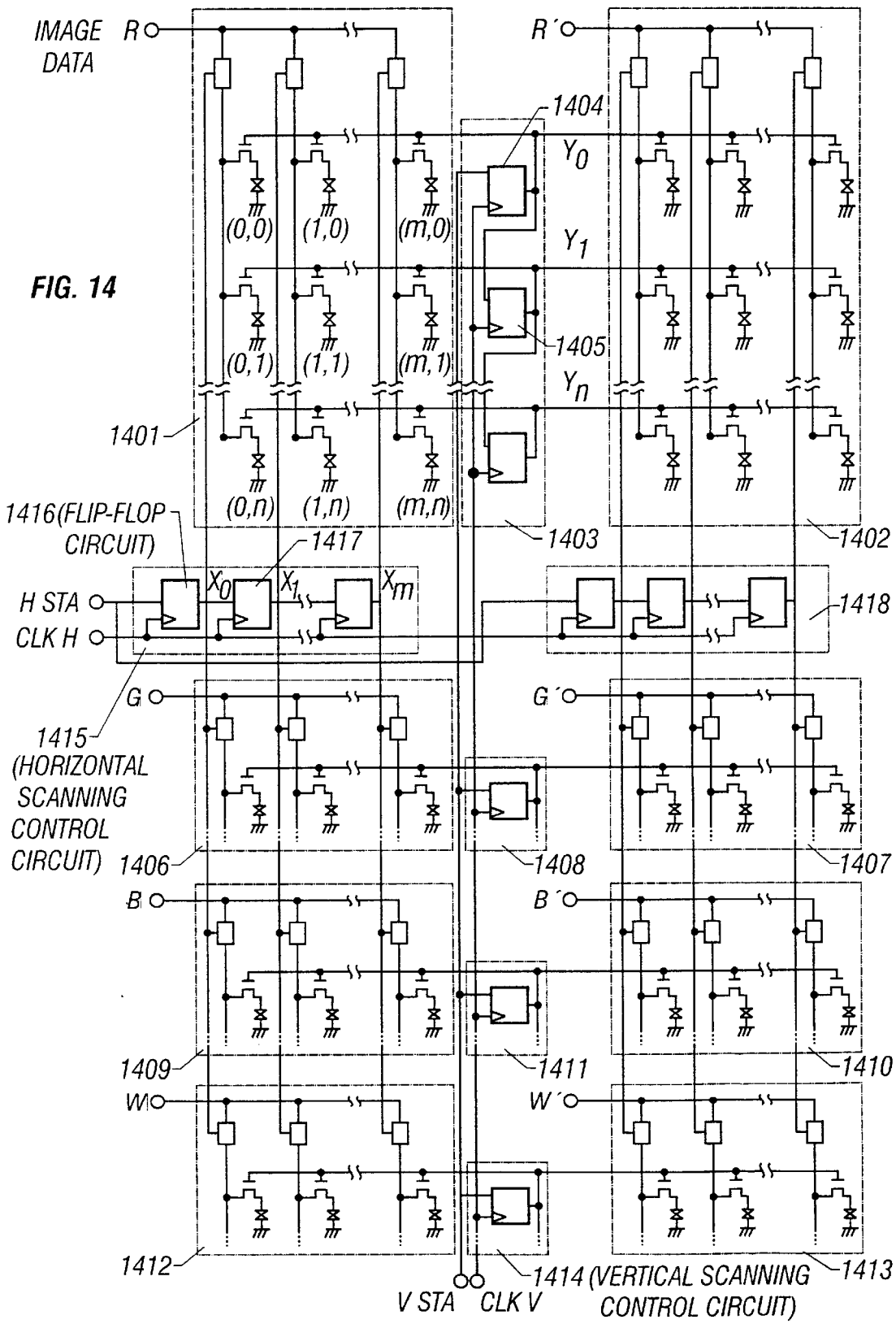
FIG. 14 is a schematic circuit block diagram of an additional integrated active matrix circuit according to the invention.

One example of this arrangement is shown in FIG. 14, where two sets of active matrix regions, or pixel regions, are integrated on the same substrate. Each set of active matrix regions consists of four active matrix regions of RGBW and R'G'B'W', respectively. In total, eight regions are formed on the substrate.

In the configuration shown in FIG. 14, a vertical scanning control circuit 1403 is shared between the active matrix regions 1401 and 1402. The region 1401 is used for formation of an image of R. The region 1402 is used for formation of an image of R'. The vertical scanning control circuit 1403 has a flip-flop circuit 1404 which controls signals applied to the gates of TFTs arranged at the pixels in the $Y_0$ rows of the active matrix regions 1401 and 1402.

Similarly, the vertical scanning control circuit 1403 has another flip-flop circuit 1405 which controls signals applied to the gates of TFTs arranged at the pixels in the $Y_1$ rows in the active matrix regions 1401 and 1402.

A vertical scanning control circuit 1408 is arranged so as to be shared between active matrix regions 1406 and 1407. The region 1406 is used for formation of an image of G. The region 1407 is used for formation of an image of G'. Similarly, a vertical scanning control circuit 1411 is arranged so as to be shared between active matrix regions 1409 and 1410. The region 1409 is used for formation of an image of B. The region 1410 is used for formation of an image of B'.

A vertical scanning control circuit 1414 is arranged so as to be shared between active matrix regions 1412 and 1413. The region 1412 is used for formation of an image of W. The region 1413 is used for formation of an image of W'.

A horizontal scanning control circuit 1415 is arranged so as to be shared among active matrix regions 1401, 1406, 1409, and 1412. In particular, the horizontal scanning control circuit 1415 has a flip-flop circuit 1416 which controls image data about $X_0$ rows in the active matrix regions 1401, 1406, 1409, and 1412.

The horizontal scanning control circuit 1415 has a flip-flop circuit 1417 which controls image data about $X_1$ rows in the active matrix regions 1401, 1406, 1409, and 1412.

A vertical scanning control circuit 1418 is arranged so as to be shared among active matrix regions 1402, 1407, 1410, and 1413.

In this way, the vertical scanning control circuits are shared among their respective sets of active matrix regions, i.e., 1401, 1402; 1406, 1407; 1409, 1410; 1412, 1413.

The horizontal scanning control circuit 1415 is arranged so as to be shared among active matrix regions 1401, 1406, 1409, and 1412. The vertical scanning control circuit 1418 is arranged so as to be shared among active matrix regions 1402, 1407, 1410, and 1413.

As shown in FIG. 14, if two active matrix regions are added to produce a composite color image, the number of peripheral driver circuits is greater than the number of peripheral driver circuits shown in FIG. 2 by only one, i.e., the vertical scanning control circuit 1414.

If the device density of the integrated configuration on the same substrate is increased, it is not necessary to arrange peripheral circuits in a complex manner, because the peripheral circuits share common active regions. This is quite advantageous in that it is not necessary to increase high-density peripheral circuits so much.

Figure 15:
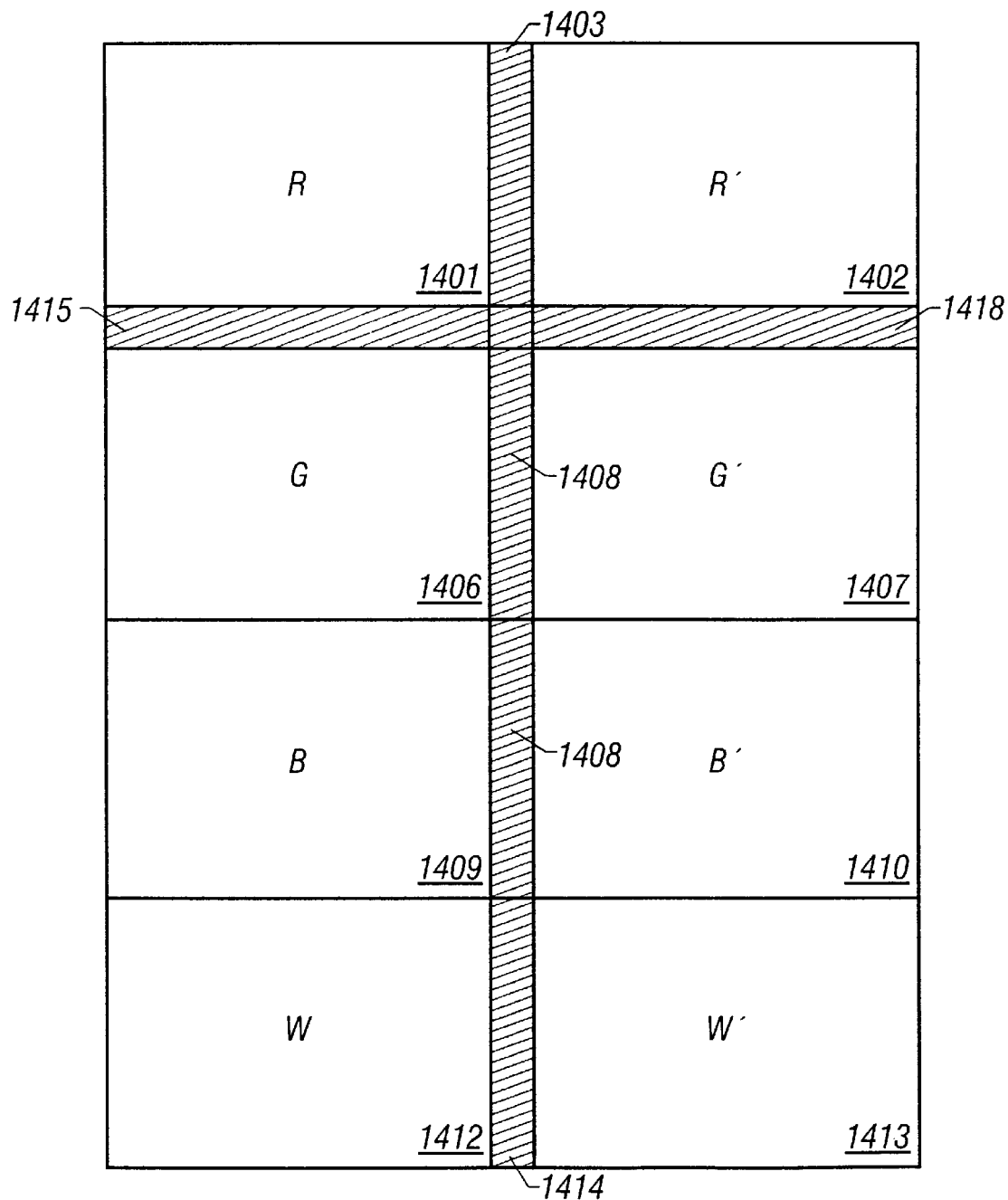
FIG. 15 is a schematic view of a yet further integrated active matrix circuit according to the invention.

FIG. 15 shows the condition in which the circuits shown in the block diagram of FIG. 14 are integrated on a substrate in practice. As shown in FIG. 15, the peripheral circuits can be made fewer than the active matrix regions and so the whole construction can be made simple.

EXAMPLE 12

Figure 16:
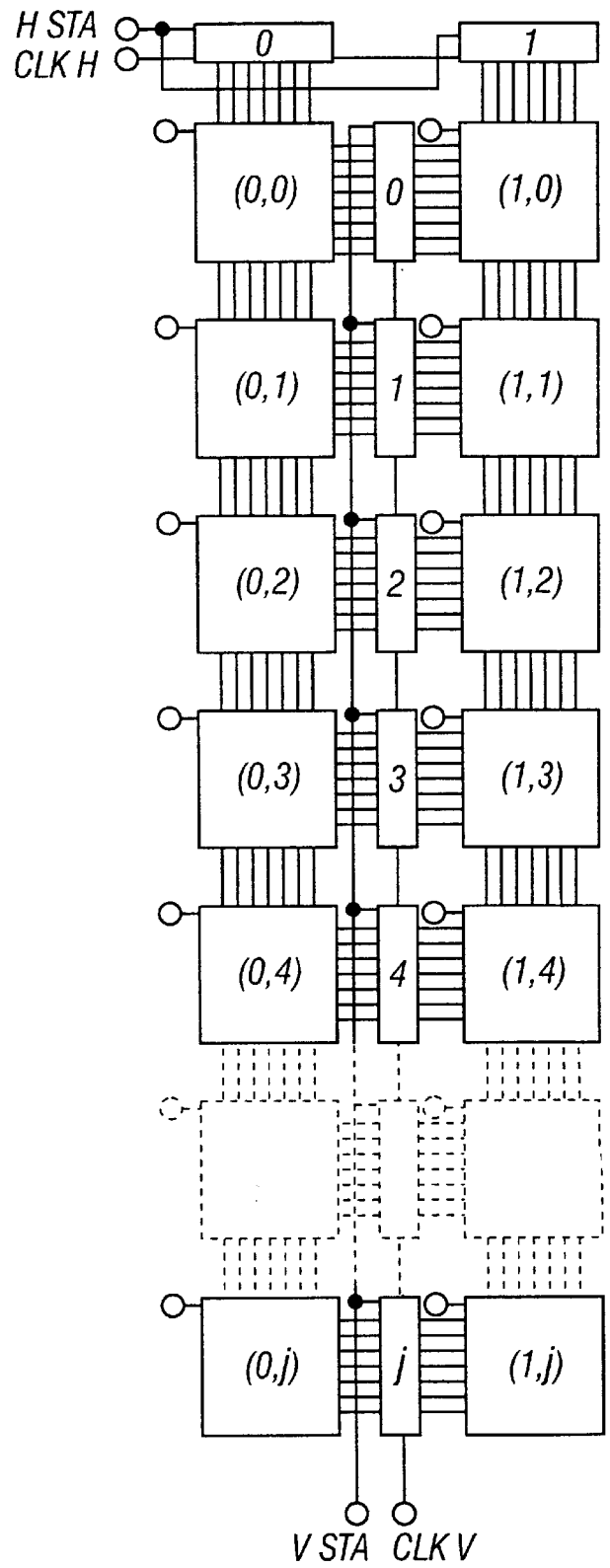
FIG. 16 is a schematic view of a still other integrated active matrix circuit according to the invention.

The present example is an extension of the configurations shown in FIGS. 14 and 15. FIG. 16 is a schematic block diagram of the present example. The circuits are expressed in terms of blocks. That is, the elements are schematically shown. The configuration of each circuit block is the same as the configurations shown in FIGS. 2 and 14.

In the configuration shown in FIG. 16, a horizontal scanning control circuit indicated by 0 drives a plurality of active matrix regions, or pixel regions, indicated by (0, 1), (0, 2), . . . , (0, j) (where j is a natural number including 0).

Another horizontal scanning control circuit indicated by 1 drives a plurality of active matrix regions, or pixel regions, indicated by (1, 0), (1, 1), . . . , (1, j) (where j is a natural number including 0).

Vertical scanning control circuits indicated by 0–j drive their respective two active matrix regions, or pixel regions, indicated by (0, 0), (1, 0); (0, 1), (1, 1); (0, 2), (1, 2); and so on.

The role of each active matrix region may be determined according to the need. For example, the same image is optically modulated by all active matrix regions to superimpose (i×j) images. This increases the illuminance of the resulting composite image accordingly.

For example, one color image of RGB is created with the active matrix regions (0, 0), (0, 1), and (0, 2). Another color image is created with the active matrix regions (0, 3), (0, 4), and (0, 5). A further color image is created with the active matrix regions (1, 0), (1, 1), and (1, 2). In this way, a number of color images are formed. Finally, they are combined into one desired large image on the screen, using appropriate optics.

Figure 17:
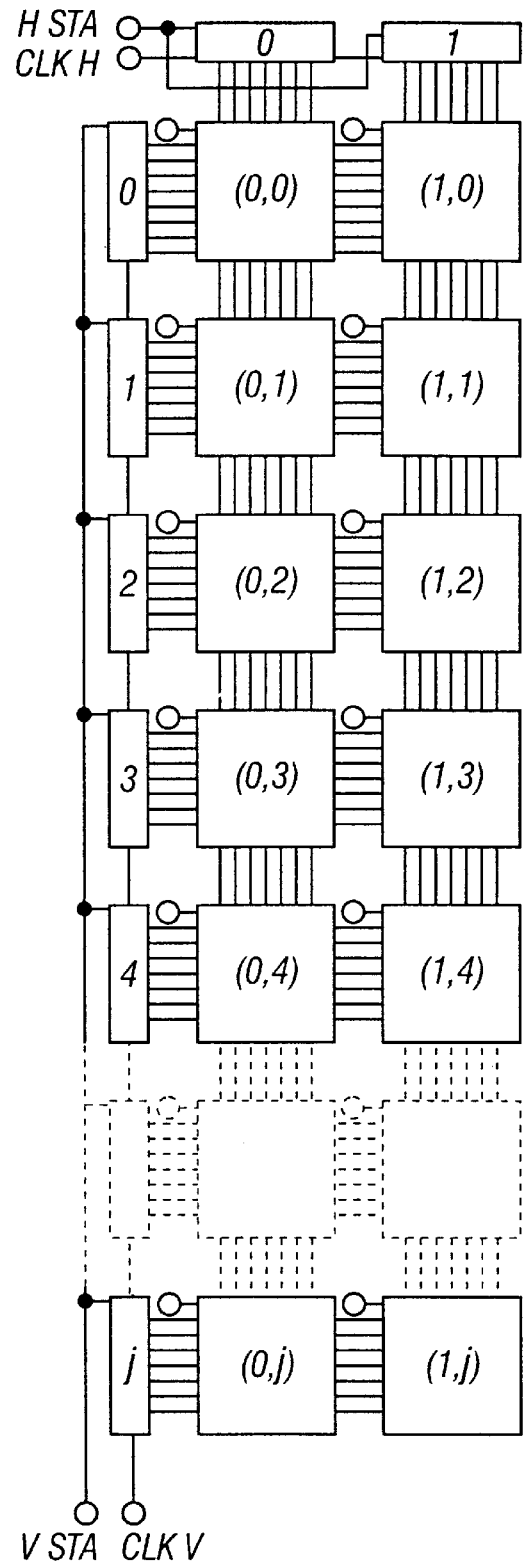
FIG. 17 is a schematic view of a still additional integrated active matrix circuit according to the invention.

FIG. 17 shows a configuration similar to the configuration shown in FIG. 16 except that the arrangement of the vertical scanning control circuits is modified.

Figure 18:
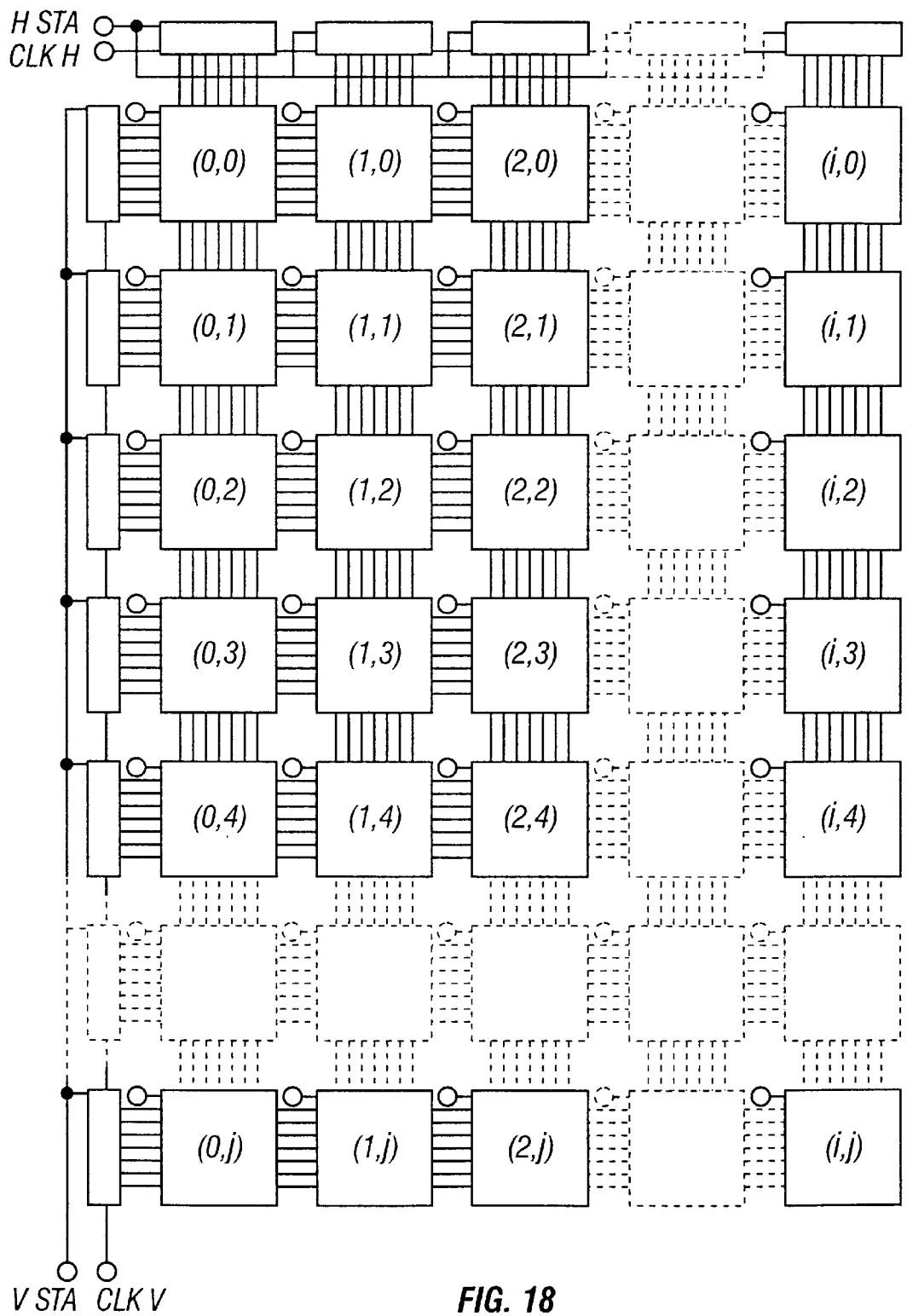
FIG. 18 is a schematic circuit block diagram of a yet additional integrated active matrix circuit according to the invention.

FIG. 18 shows an example in which (i×j) active matrix regions are arranged in rows and columns and integrated.

Although the regions are integrated in this way, the number of peripheral circuits is limited to (i+j).

As clearly shown in FIG. 18, the peripheral circuits are arranged so as to be shared among the active matrix regions. Although the numerous active matrix regions are integrated, it is not necessary to increase the number of peripheral circuits so much.

EXAMPLE 13

In FIG. 2, one TFT is disposed at each pixel of active matrix regions. This is the most fundamental and simplest example of arrangement of pixels of the active matrix construction. In actual applications, various modifications are made in obtaining desired characteristics.

The following pixel configuration is not limited to the example of FIG. 2 but is similarly applicable to other examples. FIG. 19(A) schematically shows the electrical configuration of one pixel portion 1911 forming a matrix region. In this portion, a TFT 1908 is connected as a switching device to a pixel electrode 1912 for applying an electric field to a liquid crystal material 1910. The configuration shown in FIG. 19(A) is equivalent to one pixel which forms a matrix region shown in FIG. 2 and to which an auxiliary capacitor 1909 is added.

In FIG. 19(A), the TFT 1908 has a gate to which a gate signal line 1903 is connected. A signal for turning on and off the TFT is applied from the vertical scanning control circuit 1901 to the gate signal line 1903, which corresponds to the flip-flop circuit 211 shown in FIG. 2. The source of the TFT 1908 is connected with an image signal line 1915 to which image data accepted and held by a sample-and-hold circuit 1913 is supplied via an image data line 1914. A signal from an image signal line 1904 connected with a horizontal scanning control circuit 1902 and corresponding to the image sampling signal line 208 shown in FIG. 2 causes the sample-and-hold circuit 1913 to select data.

The TFT has a drain 1906 with which the auxiliary capacitor 1909 and the liquid crystal material 1910 are connected as loads in parallel. The auxiliary capacitor 1909 is disposed to prolong the time for which information written into the liquid crystal leaks out in the form of leakage current (OFF current) from the TFT 1908. The auxiliary capacitor also acts to produce the desired capacitance.

However, it is impossible to increase the value of the auxiliary capacitor 1909 inordinately because of the relation to the response speed. In the present situation, the OFF current value of the TFT 1908 is so large that it cannot be neglected.

Accordingly, it is difficult for the present technical level to hold electric charge in the pixel electrode 1912 for a given time. In practice, the quality of the displayed image is poor, or flicker occurs.

Of course, if the characteristics of the TFT 1908 are satisfactory, the configuration shown in FIG. 19(A) is simple and desirable.

A structure as shown in FIG. 19(B) solves the foregoing problem. This structure is similar to the configuration shown in FIG. 19(A) except that another TFT 1916 is added. Since the two TFTs are connected with each other directly, the voltage applied between the source and drain of each one TFT can be halved. This permits a decrease in the OFF current. Hence, the time for which electric charge is held in the pixel electrode 1912 can be prolonged.

In the configuration shown in FIG. 19(B), the same signal is applied to the gates 1907 and 1918 of the two TFTs 1908 and 1916, respectively. That is, the two TFTs operate in the same manner. The drain 1917 of the TFT 1916 is connected with one electrode of the auxiliary capacitor 1909 and with the pixel electrode 1912. This configuration operates in the same way as the configuration shown in FIG. 2.

EXAMPLE 13

Figure 20A:
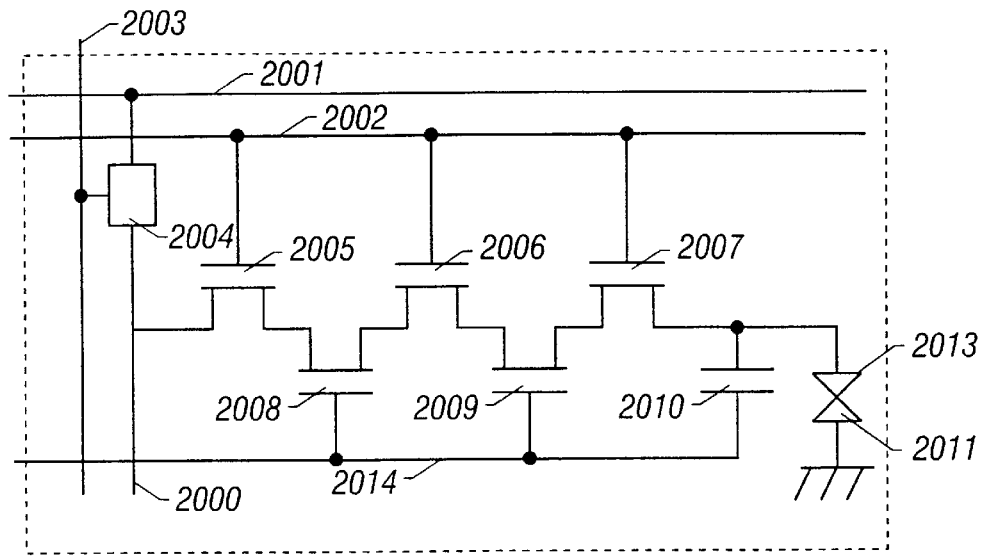
FIGS. 20(A) and 20(B) are equivalent circuit diagrams of pixels having other structure.

The present example achieves lower leakage current than the configuration of Example 12 and further prolongs the time for which electric charge is held in the pixel electrode. The configuration of the present example is shown in FIG. 20(A) and comprises image signal lines 2000 and gate signal lines 2002 arranged in rows and columns. Pixel electrodes 2013 are disposed in regions surrounded by the pixel signal lines and gate signal lines. This configuration is characterized in that n TFTs 2005, 2008, 2006, 2009, and 2007 of the same conductivity type are connected in series adjacent to each pixel electrode 2103. In the illustrated example, n=5. The source or drain of the first (n=1) one of the TFTs is connected with the image signal lines 2000. The drain or source of the n-th one (in the illustrated example, n=5) of the TFTs is connected with the pixel electrode 2013. The gate electrodes of n–m (n>m) (in the case of FIG. 20(A), n=5 and m=2) TFTs are all connected with the gate signal lines 2002. In the m TFTs 2008 and 2009, the gate potential (determined by a line 2014) is clamped at such a potential that their channel formation regions assume the same conductivity type as the source and drain regions.

In the configuration described above, n and m are natural numbers excluding 0. It is desired that n=5 or more in order to produce desired effect. The TFTs 2008 and 2009 are connected with the capacitance line 2014 for maintaining appropriate potential.

In this structure, the voltage applied between the source and drain of each TFT can be reduced. Furthermore, the TFTs 2008 and 2009 can act as MOS capacitors. Consequently, the time for which electric charge is retained in the pixel electrode 2013 can be extended, the pixel electrode 2013 serving to apply an electric field to the liquid crystal 2011 in the pixel portion. That is, during the time interval between the instant when information is written and the instant when information is next written, leakage of electric charge from the pixel electrode 2013 can be prevented.

Figure 20B:
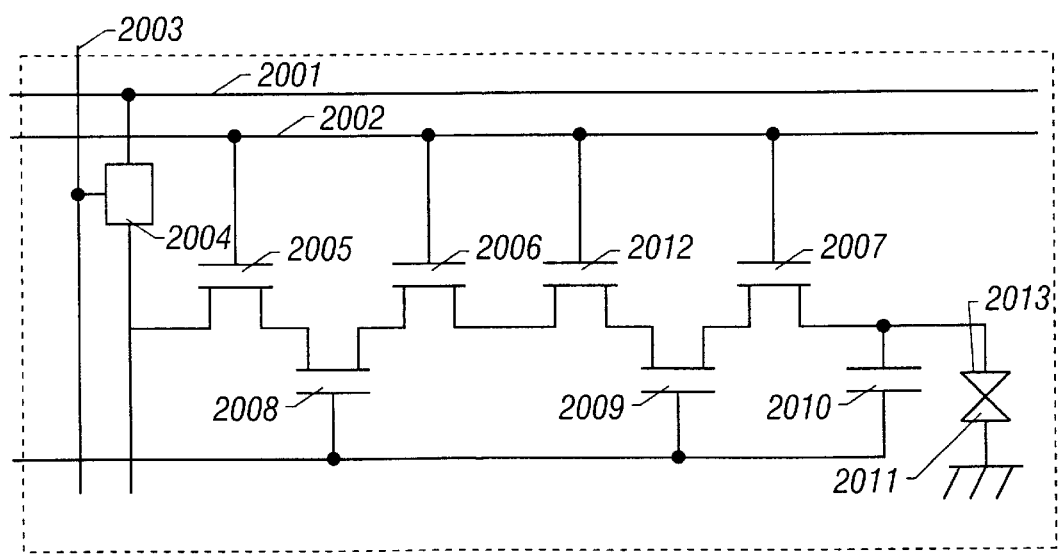

FIG. 20(B) shows a configuration similar to the configuration shown in FIG. 20(A) except that a TFT 2012 is added. This can further enhance the ability to hold electric charge in the pixel electrode 2013.

EXAMPLE 14

The present example is an integrated liquid crystal panel for optically modulating two sets of images of RGB. The configuration of the present example is identical with the configurations shown in FIGS. 1 and 2 in that two images of RGB are optically modulated.

Figure 21:
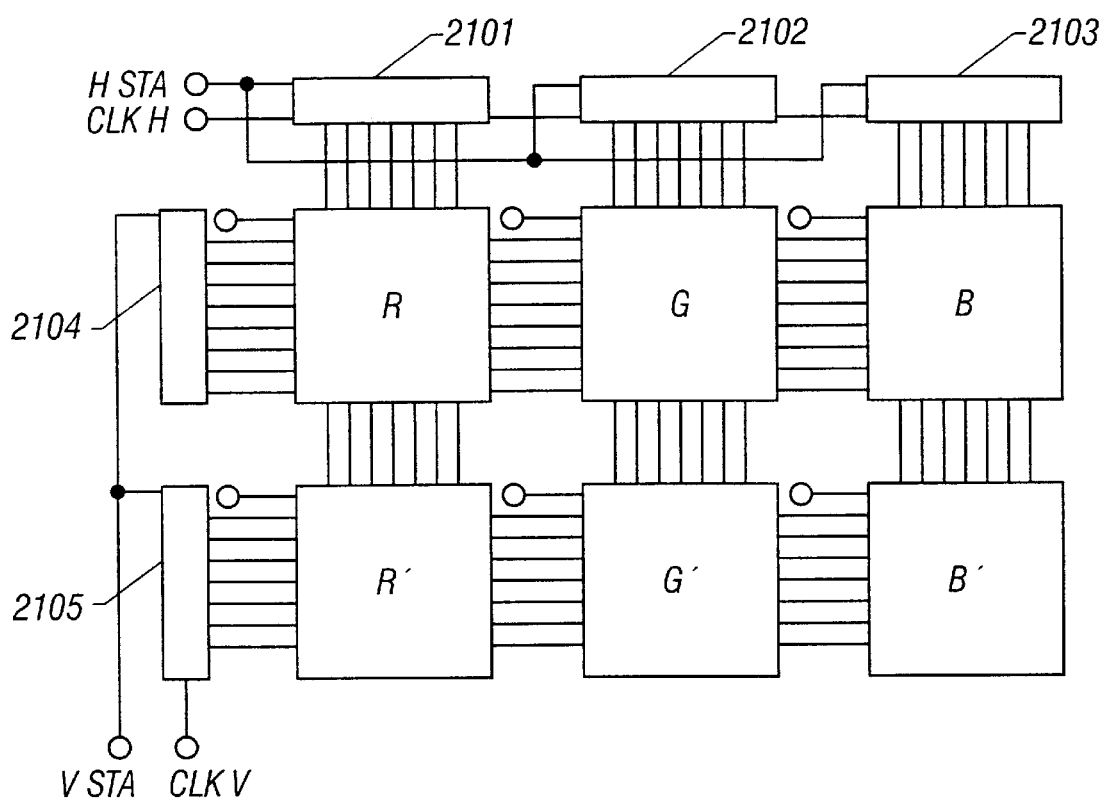
FIG. 21 is a schematic circuit block diagram of a still further integrated active matrix circuit according to the invention.

FIG. 21 is a block diagram schematically showing the configuration of the present example. The configuration shown in FIG. 21 is characterized in that active matrix regions of RGB are driven by a common horizontal scanning control circuit 2104.

In the configuration shown in FIG. 2, the horizontal scanning control circuits are shared among the active matrix regions of RGB. Image data applied to the sources of TFTs in the rows of the active matrix regions are selected under the control of circuits shared among the active matrix regions about RGB or R'G'B'.

On the other hand, in the configuration shown in FIG. 21, selection of voltages applied to the gates of TFTs in the rows of the active matrix regions is done under control of common circuits (such as the horizontal scanning control circuit 2104 shown in FIG. 21) for RGB or R'G'B'.

The operation is similar to the operation of Example 1 except that image data supplied to the active matrix regions are different from the data supplied in the case of FIG. 2.

EXAMPLE 15

In the present example, a high information content display is provided, using a projection display system as shown in FIG. 5 or 6. Generally, in a projection display system, an image is expanded greatly and projected. Also, in normal image display, the number of scanning lines is determined by standards. Accordingly, if the observer views the expanded image at a short distance from the image projected by the projection display system, the spacing between the successive scanning lines may become conspicuous. The present example pertains to a structure which solves this problem.

The projection display systems shown in FIGS. 5 and 6 have a function of creating two color images of RGB at the same time. In Example 4, two like images are created and made to overlap each other, thus giving rise to higher illuminance.

The present example is characterized in that the scanning lines of two images are not made to overlap each other but the two images are projected in such a way that their scanning lines are slightly shifted from each other. FIGS. 22(A) and 22(B) pictorially show the state of scanning lines of images projected onto a screen.

In the configuration shown in FIG. 22(A), 1 line of data about horizontal scanning forming a part of an image is displayed at vertically shifted positions on the screen. In this method of display, the number of scanning lines is apparently doubled. Consequently, the resolution, especially the vertical resolution, can be enhanced.

The method of shifting the image can use optics or previously shift the arrangements of matrix regions shown in FIGS. 1 and 2. The latter method does not need any cumbersome optical axis alignment and hence is advantageous. The shifted distance is about half of the distance between vertically adjacent pixels.

The configuration shown in FIG. 22(B) is characterized in that two images are slightly shifted horizontally. This can enhance the density inside the scanning lines apparently. As a result, the horizontal resolution can be improved. Also, the illuminance of the displayed image can be enhanced.

The method of shifting the image can use optics or previously shift the arrangement of matrix regions shown in FIGS. 1 and 2. The shifted distance is about half of the distance between horizontally adjacent pixels on the screen.

Common vertical and horizontal scanning control circuits are arranged so as to be shared among a plurality of active matrix regions integrated on the same substrate. Although this structure gives rise to high quality, the whole structure can be made as simple as possible. Furthermore, the fabrication cost can be curtailed. In addition, the production yield can be enhanced. Moreover, the number of the vertical and scanning control circuits can be made fewer. Hence, lower electric power consumption can be accomplished. Further, high reliability can be obtained.

Additionally, a display device which has these advantages and is capable of displaying a bright image and a three-dimensional image can be provided. Also, a structure which can selectively display a two-dimensional image and a three-dimensional image can be offered.

What is claimed is:

1. A display system comprising:

a substrate;

a liquid crystal panel comprising plural sets of active matrix regions and peripheral circuits for controlling horizontal or vertical scanning of said active matrix regions, said plural sets of active matrix regions being integrated with said peripheral circuits on said substrate, each set of said active matrix regions comprising plural active matrix regions for performing optical modulation;

a projection means for projecting images created by said plural sets of active matrix regions onto a screen;

horizontal or vertical scanning of one set of said active matrix regions being controlled by a common one of said peripheral circuits wherein said common one of the peripheral circuits is located between adjacent active matrix regions of said one set of the active matrix regions;

one set of said plural sets of active matrix regions forming a color image for the right eye;

another set of said plural sets of active matrix regions forming a color image for the left eye;

wherein said color image for the right eye and said color image for the left eye are superimposed and are one of projected onto said screen or superimposed on said screen, whereby displaying a three-dimensional image, wherein both said plural sets of active matrix regions and said peripheral circuits are each formed with thin film transistors over said substrate.

2. A display system comprising:

a substrate;

a liquid crystal panel comprising two sets of active matrix regions and peripheral circuits for controlling horizontal or vertical scanning of said active matrix regions, said two sets of active matrix regions being integrated with said peripheral circuits on said substrate, each set of said active matrix regions comprising three active matrix regions for performing optical modulation of R, G, and B;

a projection means for projecting images created by said two sets of active matrix regions onto a screen;

horizontal or vertical scanning of said two sets of said active matrix regions being controlled by a common one of said peripheral circuits;

one set of said plural sets of active matrix regions forming a color image for the right eye;

another set of said plural sets of active matrix regions forming a color image for the left eye;

wherein said color image for the right eye and said color image for the left eye are superimposed and projected onto said screen or superimposed on said screen, thereby displaying a three-dimensional image, said two sets of active matrix regions and said peripheral circuits both being formed within thin film transistors over said substrate, and wherein said common one of the peripheral circuits is located between said two sets of the active matrix regions.

3. A display device comprising:

a substrate;

at least first and second active matrix circuits, each comprising thin film transistors formed over said substrate; and a common scanning circuit which commonly scans said first and second active matrix circuits in one of vertical or horizontal directions, wherein said common scanning circuit comprises thin film transistors, and said common scanning circuit is positioned between said first and second active matrix circuits.

4. A display device according to claim 3 further including a third active matrix circuit, wherein said first, second and third active matrix circuits each operate to modulate one primary color of light, respectively, and are commonly scanned by said common scanning circuit.

5. A display device according to claim 3 wherein said substrate is selected from the group consisting of glass and quartz.

* * * * *